US012647627B1

(12) United States Patent
Shang et al.

(10) Patent No.: US 12,647,627 B1
(45) Date of Patent: Jun. 2, 2026

(54) COMPUTER-IMPLEMENTED METHODS FOR DYNAMIC SECONDARY CONTENT INSERTION IN MULTIVIEW VIDEO STREAMING

(71) Applicant: Amazon Technologies, Inc., Seattle, WA (US)

(72) Inventors: Zaixi Shang, Seattle, WA (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/972,481

(22) Filed: Dec. 6, 2024

(51) Int. Cl.
| | |
|---|---|
| *H04N 21/234* | (2011.01) |
| *H04N 21/2187* | (2011.01) |
| *H04N 21/2662* | (2011.01) |

(52) U.S. Cl.
CPC ....... *H04N 21/234* (2013.01); *H04N 21/2187* (2013.01); *H04N 21/2662* (2013.01)

(58) Field of Classification Search
CPC ............. H04N 21/234; H04N 21/2187; H04N 21/2662
See application file for complete search history.

(56) References Cited

U.S. PATENT DOCUMENTS

| | | | | |
|---|---|---|---|---|
| 8,918,533 | B2 * | 12/2014 | Chen ................ | H04N 21/23439 709/231 |
| 2014/0301464 | A1 * | 10/2014 | Wu ........................ | H04N 19/70 375/240.15 |
| 2025/0142089 | A1 * | 5/2025 | DeWeese ............. | H04N 19/124 |

OTHER PUBLICATIONS

Amon, Peter et al., "Compressed Domain Stitching of HEVC Streams for Video Conferencing Applications", 19th International Packet Video Workshop, May 2012, 5 pages.
De Rivaz, Peter et al., "AV1 Bitstream & Decoding Process Specification", Jan. 8, 2019, 681 pages [retrieved from aomediacodec. github.io/av1-spec/av1-spec.pdf].

(Continued)

*Primary Examiner* — Nathan J Flynn
*Assistant Examiner* — Christine A Kurien
(74) *Attorney, Agent, or Firm* — NICHOLSON DE VOS WEBSTER & ELLIOTT LLP

(57) ABSTRACT

Techniques for enabling dynamic secondary content insertion in multiple view (multiview) video streaming using bitstream stitching techniques are described. According to some examples, a computer-implemented method includes sending a first live video stream and a second live video stream having a same group of pictures duration to a single decoder of a device for simultaneous viewing; receiving an indication of a break within a group of pictures of the first live video stream for displaying a secondary content video stream; sending, in response to the receiving the indication, one or more fill frames to the single decoder of the device to display between a start of the break and an end of the group of pictures of the first live video stream for simultaneous viewing with the second live stream; and sending, in response to the receiving the indication, the secondary content video stream having the same group of pictures duration as the first live video stream to the single decoder of the device for simultaneous viewing with the second live stream after displaying of the one or more fill frames.

20 Claims, 21 Drawing Sheets

(56)        References Cited

OTHER PUBLICATIONS

Feldmann, Christian et al., "Efficient Stream-Reassembling for Video Conferencing Applications using Tiles in HEVC", The Fifth International Conferences on Advances in Multimedia (MMEDIA 2013), Apr. 2013, pp. 130-135.

Google LLC, "Watch Multiple Events on One Screen in Multiview on YouTube TV", Jan. 2024, 3 pages [retrieved from support.google.com/youtubetv/answer/13418774?hl=en].

International Telecommunication Union, "High Efficiency Video Coding", Recommendation ITU-T H.265(V10), Jul. 2024, 728 pages.

Kammachi-Sreedhar, Kashyap et al., "Omnidirectional Video Delivery with Decoder Instance Reduction", Internet Technology Letters, vol. 2, No. 1, Oct. 23, 2018, 6 pages.

Sanchez, Y. et al., "Compressed Domain Video Processing for Tile Based Panoramic Streaming Using Hevc", IEEE International Conference on Image Processing (ICIP), Sep. 2015, pp. 2244-2248.

Sanchez, Y., "Low Complexity Cloud-video-Mixing Using HEVC", 2014 IEEE 11th Consumer Communications and Networking Conference (CCNC), Jan. 2014, pp. 213-218.

Stoller, Max et al., "Add Multiple Hosts to Live Streams with Amazon IVS", AWS for M&E Blog, Mar. 23, 2023, 6 pages [retrieved from aws.amazon.com/blogs/media/add-multiple-hosts-to-live-streams-with-amazon-ivs].

Wikimedia Foundation, Inc., "Block Cipher Mode of Operation", Wikipedia online encyclopedia entry, Feb. 18, 2024 [retrieved from https://en.wikipedia.org/w/index.php?title=Block_cipher_mode_of_operation&oldid=1217686350].

Youtube, LLC, "Two (or Four) is Better than One: Building Multiview on YouTube TV", Mar. 14, 2023, 7 pages [retrieved from blog.youtube/news-and-events/multiview-on-youtube-tv/].

Zare, Alireza et al., "HEVC-compliant Tile-based Streaming of Panoramic Video for Virtual Reality Applications", Proceedings of the 24th ACM international conference on Multimedia, Oct. 2016, pp. 601-605.

U.S. Appl. No. 18/671,674, Pending.

Non-Final Office Action, U.S. Appl. No. 18/671,674, Nov. 5, 2025, 10 pages.

* cited by examiner

COMBINED VIDEO (E.G.,COMBINED HEVC STREAM)
160

Primary
802

Secondary
804-1

Secondary
804-2

Secondary
804-3

Secondary
804-4

SLICE SEGMENT HEADER SEMANTICS 900
(using tiles)

| slice_segment_header( ) { | Descriptor |
|---|---|
| first_slice_segment_in_pic_flag   902 | u(1) |
| if( nal_unit_type >= BLA_W_LP && nal_unit_type <= RSV_IRAP_VCL23 ) | |
|    no_output_of_prior_pics_flag | u(1) |
| slice_pic_parameter_set_id | ue(v) |
| if( !first_slice_segment_in_pic_flag ) { | |
|    if( dependent_slice_segments_enabled_flag ) | |
|      dependent_slice_segment_flag | u(1) |
|    slice_segment_address   904 | u(v) |
| } | |

*FIG. 9*

SEQUENCE PARAMETER SET (SPS) SEMANTICS 1000

| seq_parameter_set_rbsp( ) { | Descriptor |
|---|---|
| sps_video_parameter_set_id | u(4) |
| sps_max_sub_layers_minus1 | u(3) |
| sps_temporal_id_nesting_flag | u(1) |
| profile_tier_level( 1, sps_max_sub_layers_minus1 ) | |
| sps_seq_parameter_set_id | ue(v) |
| chroma_format_idc | ue(v) |
| if( chroma_format_idc == 3 ) | |
| separate_colour_plane_flag | u(1) |
| pic_width_in_luma_samples 1002 | ue(v) |
| pic_height_in_luma_samples 1004 | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |

FIG. 10

PICTURE  PARAMETER SET (PPS) SEMANTICS 1100

| | |
|---|---|
| if( tiles_enabled_flag ) { | |
| num_tile_columns_minus1 1102 | ue(v) |
| num_tile_rows_minus1 1104 | ue(v) |
| uniform_spacing_flag | u(1) |
| if( !uniform_spacing_flag ) { | |
| for( i = 0; i < num_tile_columns_minus1; i++ ) | |
| column_width_minus1[ i ] 1106 | ue(v) |
| for( i = 0; i < num_tile_rows_minus1; i++ ) | |
| row_height_minus1[ i ] 1108 | ue(v) |
| } | |
| loop_filter_across_tiles_enabled_flag | u(1) |
| } | |

| | |
|---|---|
| if( tiles_enabled_flag ) { | |
| num_tile_columns_minus1 | ue(v) |
| num_tile_rows_minus1 | ue(v) |
| uniform_spacing_flag 1110 | u(1) |
| if( !uniform_spacing_flag ) { | |
| for( i = 0; i < num_tile_columns_minus1; i++ ) | |
| column_width_minus1[ i ] | ue(v) |
| for( i = 0; i < num_tile_rows_minus1; i++ ) | |
| row_height_minus1[ i ] | ue(v) |
| } | |
| loop_filter_across_tiles_enabled_flag 1112 | u(1) |
| } | |

*FIG. 11*

REFERENCE PICTURE LIST MODIFICATION SEMANTICS 1200

| ref_pic_lists_modification( ) { | Descriptor |
|---|---|
| ref_pic_list_modification_flag_l0 1202 | u(1) |
| if( ref_pic_list_modification_flag_l0 ) | |
| for( i = 0; i <= num_ref_idx_l0_active_minus1; i++ ) | |
| list_entry_l0[ i ] | u(v) |
| if( slice_type == B ) { | |
| ref_pic_list_modification_flag_l1 1204 | u(1) |
| if( ref_pic_list_modification_flag_l1 ) | |
| for( i = 0; i <= num_ref_idx_l1_active_minus1; i++ ) | |
| list_entry_l1[ i ] | u(v) |
| } | |
| } | |

*FIG. 12*

CODING TREE UNIT (CTU) 1300

LUMA CODING TREE BLOCK (CTB)
1302

BLUE-DIFFERENCE ($C_B$) CHROMA CTB
1304

RED-DIFFERENCE ($C_R$) CHROMA CTB
1306

SYNTAX ELEMENT(S)
1308

*FIG. 13*

PICTURE WITH 144 (i.e., 16 x 9) CODING TREE BLOCKS (CTBs) PARTITIONED
INTO SLICE SEGMENTS 1400

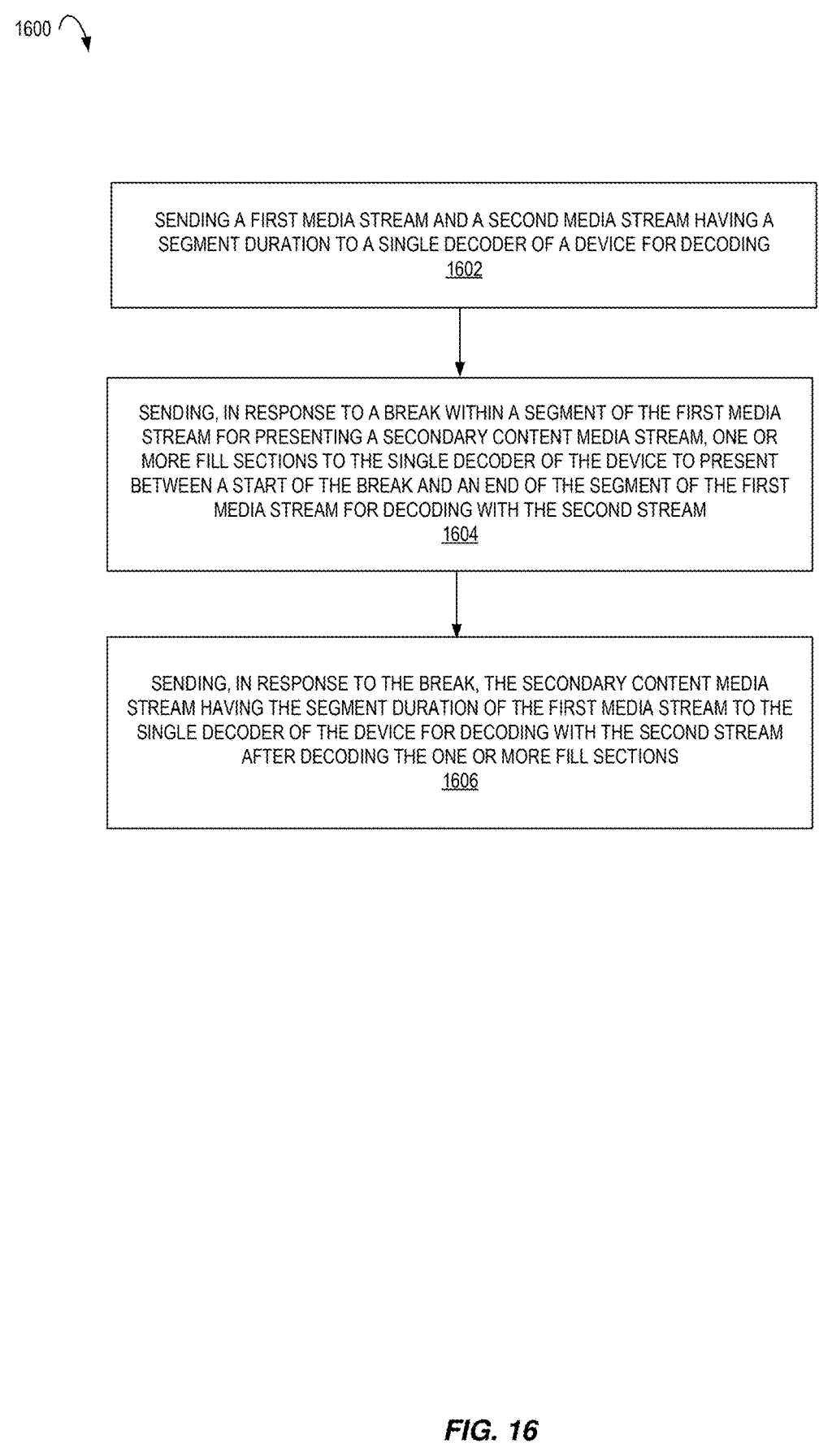

1600

SENDING A FIRST MEDIA STREAM AND A SECOND MEDIA STREAM HAVING A
SEGMENT DURATION TO A SINGLE DECODER OF A DEVICE FOR DECODING
1602

SENDING, IN RESPONSE TO A BREAK WITHIN A SEGMENT OF THE FIRST MEDIA
STREAM FOR PRESENTING A SECONDARY CONTENT MEDIA STREAM, ONE OR
MORE FILL SECTIONS TO THE SINGLE DECODER OF THE DEVICE TO PRESENT
BETWEEN A START OF THE BREAK AND AN END OF THE SEGMENT OF THE FIRST
MEDIA STREAM FOR DECODING WITH THE SECOND STREAM
1604

SENDING, IN RESPONSE TO THE BREAK, THE SECONDARY CONTENT MEDIA
STREAM HAVING THE SEGMENT DURATION OF THE FIRST MEDIA STREAM TO THE
SINGLE DECODER OF THE DEVICE FOR DECODING WITH THE SECOND STREAM
AFTER DECODING THE ONE OR MORE FILL SECTIONS
1606

*FIG. 16*

COMPUTER-IMPLEMENTED METHODS FOR DYNAMIC SECONDARY CONTENT INSERTION IN MULTIVIEW VIDEO STREAMING

BACKGROUND

In certain examples, a viewer desires to watch more than one video stream simultaneously, for example, to watch multiple camera views of the same live event. In certain examples, a single device includes multiple decoders to decode multiple encoded video streams (e.g., one decoder for each respective video stream) for simultaneous viewing of the multiple video streams. However, using multiple decoders in a single device has high resource (e.g., power and computing resources) requirements for the single device, and numerous devices do not include or support multiple decoders.

Further, in certain instances it is desirable to display secondary content in one of the multiple view (multiview) streams, but doing so presents a complex set of unique challenges that must be addressed to ensure seamless content delivery and maintain the integrity of the viewing experience. In certain examples, the challenges include maintaining a fragment (e.g., group of pictures (GOP)) alignment across views during secondary content insertion, handling differing (e.g., non-integer second) secondary content durations, managing frame rate discrepancies, and integrating "burned in" secondary content.

BRIEF DESCRIPTION OF DRAWINGS

Various examples in accordance with the present disclosure will be described with reference to the following drawings.

FIG. 9 is an example of slice header semantics for including multiple videos for simultaneous viewing according to some examples.

FIG. 10 is an example of sequence parameter set (SPS) semantics for including multiple videos for simultaneous viewing according to some examples.

FIG. 11 is an example of picture parameter set (PPS) semantics for including multiple videos for simultaneous viewing according to some examples.

FIG. 12 is an example of reference picture list modification semantics for including multiple videos for simultaneous viewing according to some examples.

FIG. 13 is an example of a coding tree unit (CTU) according to some examples.

FIG. 16 is a flow diagram illustrating operations of a method of generating multiple live video streams, with at least one stream being secondary content, for simultaneous viewing according to some examples.

DETAILED DESCRIPTION

Figure 1:
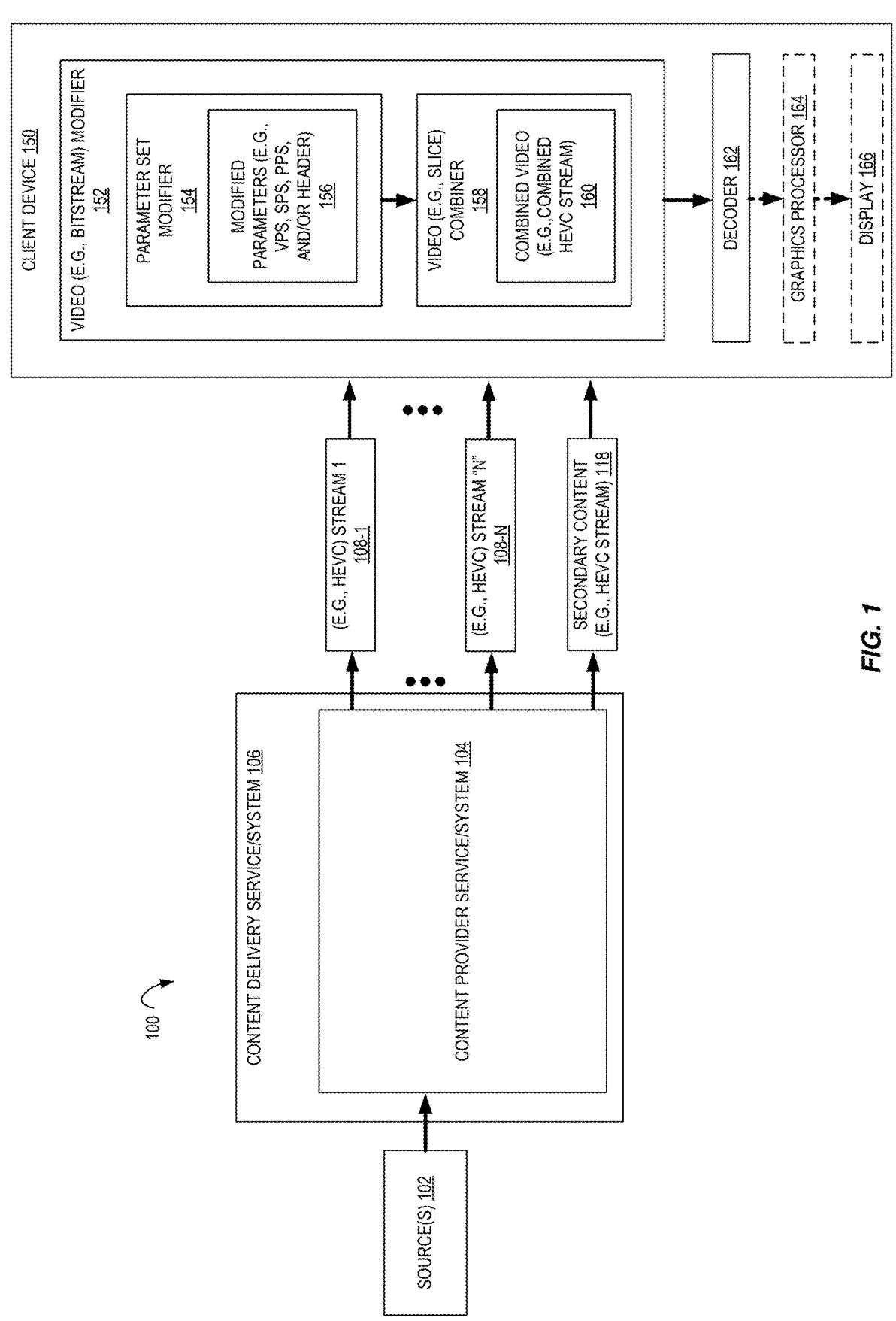
FIG. 1 is a diagram illustrating an environment including one or more sources of video streams, a content delivery service/system including a content provider service/system to generate a plurality of video streams and a secondary content stream for simultaneous viewing on a client device with a single decoder according to some examples.

The present disclosure relates to methods, apparatus, systems, and non-transitory computer-readable storage media for enabling dynamic secondary content insertion in multiple view (multiview) video streaming (e.g., encoding and/or decoding), for example, using bitstream stitching techniques, while addressing challenges related to group of pictures (GOP) alignment, different frame rates, and fall back mechanisms for burned-in secondary content (e.g., secondary content that is encoded into the stream itself, in contrast to secondary content that is sourced by a client device).

In certain examples, it is desirable to insert secondary content into main content, for example, even when the main content is part of multiview video streaming (e.g., multiple video streams that are sent to a single decoder). In certain examples, an indication (e.g., a marker) of a break within a video stream is received by a device, and the device is to insert secondary content in response to receiving the indication. In certain examples, the indication (e.g., marker) is inserted by a director and/or a production service as an indication for a client device (e.g., media player) to insert secondary content into that video stream, e.g., allowing for seamless splice points for national, local, and/or individually targeted secondary content to be inserted. In certain examples, the indication (e.g., marker) is according to an American National Standards Institute (ANSI) and/or Society of Cable Telecommunications Engineers (SCTE) standard (e.g., SCTE-35 "Digital Program Insertion Cueing Message for Cable"), e.g., that describes the inline insertion of the indication into a video stream.

However, one of the key challenges in dynamic secondary content insertion for bitstream stitching is maintaining a segment (e.g., group of pictures (GOP)) alignment between the main content and the secondary content bitstreams. In certain examples, a device's bitstream stitching algorithm for generating multiview video requires segment aligned (e.g., GOP aligned) videos for seamless stitching, but the secondary content breaks can start and end at arbitrary points, leading to irregular segment (e.g., GOP) structures in the stream once the secondary content is inserted. To address this challenge, certain examples herein encode the secondary content bitstreams with a normalized length that is an integer multiple of the segments (e.g., of the GOPs). In certain examples, the insertion of secondary content is performed after inserting a few fill (e.g., slate) frames to ensure that the segment alignment (e.g., GOP alignment) is maintained after the dynamic secondary content insertion process.

Another challenge arises when the main content and secondary content bitstreams have different frame rates and the bitstream stitching algorithm requires all bitstreams to have the same frame rate. To address this challenge, certain examples herein utilize a bitstream stitching algorithm that allows for hybrid frame rates within the stitched bitstream, e.g., where this is achieved by carefully designing the segment (e.g., GOP) structure of the main content and secondary content bitstreams, enabling seamless integration of bitstreams with different frame rates.

In cases where dynamic (e.g., based on the user and/or their device) secondary content insertion fails or is not feasible, certain examples herein provide a fallback mechanism for burned-in (e.g., not based on the user and/or their device) secondary content. In certain examples, burned-in secondary content is overlaid directly onto the main content video frames. However, burned-in secondary content may have irregular segment (e.g., GOP) structures which cause issues during the bitstream stitching process. To mitigate this challenge, certain examples herein alter the reference picture structure, e.g., by inserting one or more skip frames at the transition segment (e.g., GOP) boundaries. This approach ensures that the burned-in secondary content can be seamlessly integrated into the stitched bitstream without disrupting the GOP alignment.

By addressing these challenges through innovative solutions, certain examples herein enable seamless dynamic secondary content insertion in multiview video encoding with bitstream stitching, while ensuring GOP alignment, handling different frame rates, reducing computational requirements by allowing use of a single decoder, improving the viewer experience by preserving continuity across views during secondary content insertion, enhancing flexibility for content providers to insert secondary content into multiview streams, and providing fall back mechanisms for burn-in secondary content. Thus, examples herein provide for personalized secondary content in immersive video experiences while preserving the quality and continuity of the multiview content, e.g., providing secondary content normalization techniques, strategic insertion of slate intra-coded frames (e.g., I-slices), and methods for maintaining reference picture set consistency across views.

Examples herein preserve the stream integrity and viewing experience while enabling effective secondary content insertion in multiview contexts.

Multiview

It is likely that the demand for a multiview experience will grow significantly, particularly in the domains of sports and entertainment. Certain examples herein are directed to multiview video streaming to cater to this demand, enabling users to watch multiple camera angles or live events simultaneously, thereby providing a more engaging and personalized viewing experience. Unlike video streaming which delivers a single video stream, in certain examples, multiview streaming allows users to navigate between different viewpoints seamlessly, offering a more interactive and dynamic way to consume video content. In certain examples, multiview streaming is achieved by utilizing a bitstream stitching component (e.g., a bitstream modifier) at the client side (e.g., not the content delivery side). In certain examples, the bitstream stitching component (e.g., a bitstream modifier) of the client device enables the seamless combination of multiple (e.g., High Efficiency Video Coding (HEVC)) encoded video streams into a single stream that can be decoded by a single (e.g., HEVC) decoder, thereby reducing the computational complexity and bandwidth requirements associated with multiview streaming. In certain examples, the bitstream stitching process is achieved by modifying specific flags and parameters located in the (e.g., HEVC) bitstream, for example, including the Video Parameter Set (VPS), Sequence Parameter Set (SPS), Picture Parameter Set (PPS), and slice headers. By carefully adjusting these flags and parameters, certain examples herein ensure that the stitched stream remains compliant with a coding standard (e.g., HEVC standard) while allowing for a single decoder to decode the (e.g., HEVC) bitstream with multiple views.

Certain examples for bitstream stitching are discussed in reference to FIGS. 4-14 below, e.g., directed to two enhancements to overcome the limitations of bitstream stitching. First, in certain examples an all-skip P-frame technique is used to mitigate the impact of packet loss, e.g., a common issue in live streaming scenarios, such as when using low-latency protocols (e.g., User Data Protocol (UDP)). In certain examples, by replicating previous frames when a view is lost or corrupted, these techniques create a freeze effect instead of a complete breakdown, ensuring a more robust and error-resilient streaming experience. Second, in certain examples, a flexible layout technology enables the seamless combination of video streams with varying resolutions, a critical requirement in adaptive bitrate streaming scenarios where the video resolution may change dynamically based on network conditions. In certain examples, the proposed layout scheme leverages tile and slice structures (e.g., in HEVC) to accommodate resolution changes during video streaming, ensuring effective stitching and maintaining the integrity of the multiview stream. In certain examples, these two enhancements provide a robust framework for delivering multiview streaming in real-world scenarios, e.g., where the all-skip P-frame technique and the flexible layout technology address key challenges in terms of error resilience and adaptability to varying network conditions, respectively.

However, the integration of dynamic secondary content insertion (DSCI) in multiview streaming systems presents additional challenges that need to be addressed to ensure seamless content delivery and maintain the integrity of the viewing experience.

Challenges for Dynamic Secondary Content Insertion (DSCI) in Multiview Streaming In certain examples, a multiview system desiring to display secondary content can (1) exiting the multiview experience at or before the secondary content insertion, then playing the secondary content in a single view mode, or (2) inserting the secondary content in a selected view(s) without exiting the multiview experience or interfering with the main content on other views. In certain examples, inserting (e.g., dynamic) secondary content into multiview streaming requires an intricate interplay between video coding (e.g., encoding and/or decoding) structures and the secondary content insertion process.

GOP Alignment and Secondary Content Insertion Point Variability

A primary challenge in integrating dynamic secondary content insertion with multiview streaming is maintaining the synchronization of the segment (e.g., group of pictures (GOP)) structure across all views. In certain examples of video compression, a GOP consists of an instantaneous decoder refresh (IDR) frame followed by one or more (e.g., predicted) non-IDR frames, with the IDR frame serving as a crucial reference point for decoding subsequent frames. The unpredictability of secondary content insertion points significantly complicates this synchronization process. In one dynamic secondary content insertion system, secondary content can be inserted at any point within a GOP, not only at GOP boundaries. This randomness in secondary content insertion can lead to scenarios where some view(s) has completed its GOP while others view(s) have partially completed their corresponding GOP at the moment of secondary content insertion. In certain examples, such discrepancies disrupt the regular cadence of the video stream, thus causing inconsistencies in the stitched multiview stream (e.g., decoded by the single decoder). In certain examples, the resulting misalignment of GOP structures and reference picture sets between views can precipitate decoding errors, visual artifacts, or synchronization issues, thereby compromising the overall viewing experience.

In certain examples, an encoder and/or decoder utilize a decoded picture buffer (DPB) to store decoded images, e.g., with the decoded images waiting to be displayed for the decoder or being stored in the DPB to be used as a reference frame for the inter-prediction coding of one or more other video frames. In certain examples, the reference frames are tagged to indicate they are to be used as references, e.g., tagged within the encoded video stream. Certain standards (e.g., HEVC) use two types of tags: (1) short-term reference to tag the frame(s) in the DPB that are to be used as inter-prediction reference frames for blocks in the current frame and/or in the two closest subsequent video frames (e.g., in the order of decoding), and (ii) long-term reference to tag the frame(s) in DPB that can be used to predict image blocks in frames that are more than two frames away from the current frame (e.g., in the order of decoding). In certain examples, the images in the DPB that are not tagged as short-term reference or long-term reference are considered unused for reference, e.g., and cannot be used at a later time to perform inter-prediction. In certain examples, the information about these tags is added to the header of each frame in the encoded video stream. In certain examples, the retained set of frames (e.g., pictures) is called the Reference Picture Set (RPS).

Non-Integer Second Durations of Secondary Content

Another significant challenge stems from non-integer durations of secondary content when the fragment (e.g., GOP) duration is an integer duration (e.g., one second long GOPs). This characteristic of certain secondary content can severely disrupt the GOP structure alignment across views, particularly when multiple secondary content streams are played consecutively. The variability in secondary content durations creates a cascading effect of misalignments, not only between consecutive secondary content but also in maintaining consistent GOP alignment with the main content after a series of secondary content. This misalignment compounds the complexity of bitstream stitching, as the inconsistent GOP lengths across different views and between secondary content and main content are to be reconciled to maintain a coherent multiview stream.

Frame Rate Discrepancies

Frame rate discrepancies between the main content and inserted secondary content present yet another layer of complexity. Certain main content is encoded at 60 frames per second (fps) while certain secondary content is produced at 30 fps. This disparity leads to significant variations in GOP length and structure between the main content and the secondary content. For instance, main content following a GOP structure optimized for 60 fps (e.g., "IPBBBPBBBPBBBPBBB" where I=I-frame, P=P-frame, and B=B-frame in the sequence of frames) would be fundamentally incompatible with a 30 fps secondary content using a structure like "IPBPBPB" in certain multistream systems. Such inconsistencies create substantial challenges in maintaining coherent reference picture sets and Picture Order Count (POC) values (e.g., indicating the display order of the frame within a GOP; ranging from 1 to the size of GOP) from across the stitched stream. Moreover, these frame rate differences complicate the temporal alignment of views in the multiview stream, potentially leading to synchronization issues that can degrade the viewing experience.

Burned-In Secondary Content and Dynamic Secondary Content Insertion

The integration of burned-in secondary content as a fallback mechanism beneath dynamic secondary content presents unique challenges for dynamic secondary content insertion in multiview streaming. In certain examples, the burned-in secondary content (e.g., within the main content media stream before the stream reaches the client device) (e.g., which appears when the dynamic secondary content fails to play) can be inserted at any point in the video stream, e.g., as triggered by an indication (e.g., SCTE-35 signal). In certain examples, this indication (e.g., signal) not only marks the start of burned-in secondary content but also initiates a new GOP (Group of Pictures), creating a situation where two GOPs may exist within a single second of video content. Such a phenomenon disrupts the standard GOP structure, typically characterized by consistent durations throughout the stream. The insertion of a new IDR frame due to the break indication (e.g., SCTE signal) breaks the original mini-GOP structure, such as the PBBBPBBB pattern. Consequently, the reference picture structure (e.g., the Reference Picture Set (RPS)) for each frame undergoes significant changes. This alteration results in a conflict between the RPS of streams containing burned-in secondary content and those without. In certain examples, this challenge is further compounded by a (e.g., HEVC) requirement that all slices within a frame must have identical RPS. This discrepancy in RPS structures between different views in a multiview streaming scenario presents substantial challenges that need to be addressed to maintain seamless playback and consistent quality across all views.

Example Bitstream Stitching Techniques

Turning now to the figures, FIG. 1 is a diagram illustrating an environment 100 including one or more sources of video streams, a content delivery service/system 106 including a content provider service/system 104 to generate a plurality of video streams (108-1 to 108-N, where N is any positive integer greater than 1) and a secondary content stream 118 for simultaneous viewing on a client device 150 with a single decoder 162 according to some examples.

In certain examples, a client device 150 requests multiple streams be displayed at the same time, e.g., on (e.g., single) display 166. In certain examples, in response to this request, the content provider service/system 104 (e.g., of content delivery service/system 106) generates a plurality of (e.g., separate) video streams 108-1 to 108-N (e.g., where N is 2, 3, 4, 5, 6, 7, 8, 9, etc. video streams) (e.g., from source(s) 102) to be combined together by client device 150, e.g., it is not a single video stream with multiple video streams within that transmitted single video stream. In certain examples, the video (e.g., bitstream) modifier 152 is to modify the video (e.g., header(s) as discussed herein) so allow for simultaneous viewing by single decoder 162. In certain examples, video (e.g., bitstream) modifier 152 includes a parameter set modifier 154, for example, to generate modified parameters 156 (e.g., modified video parameter set (VPS), sequence parameter set (SPS) (e.g., as in FIG. 10), picture parameter set (PPS) (e.g., as in FIG. 11), and/or header (e.g., slice segment header, e.g., as in FIG. 9) as discussed herein). In certain examples, video (e.g., bitstream) modifier 152 includes a video (e.g., slice) combiner 158, for example, to generate a combined video 160 (e.g., combined (e.g., HEVC) stream), e.g., based on the modified parameters 156. In certain examples, the combined video 160 is sent to single decoder 162 for decoding. In certain examples, a graphics processor 164 is included to perform further processing, e.g., to crop the decoded video according to a conformance window (see, e.g., FIG. 6). In certain examples, the (e.g., cropped in certain examples) video is then sent to display 166 for displaying (e.g., and the corresponding audio sent to a speaker for output).

In certain examples, the client device 150 (e.g., in response to an indication of a break for secondary content) requests secondary content 118 (e.g., HEVC stream), for example, request a particular (e.g., personalized) secondary content from a database of secondary content based on the user and/or their device.

In certain examples, the client device 150 (e.g., media player thereof) is separate from a primary display 166 that the user will use to view the media, e.g., as a "set-top box" or (e.g., High-Definition Multimedia Interface (HDMI) standard) plug-in "stick". Not-limiting examples are Amazon® FireTV® brand of stick media player devices and Google® (e.g., Chromecast) brand of stick media player devices. In certain examples, the client device 150 (e.g., media player thereof) includes the primary display 166 that the user will use to view the media, e.g., as a television with the media player device built in. Not-limiting examples are Amazon® FireTV® brand of (e.g., "smart") televisions.

Figure 4:
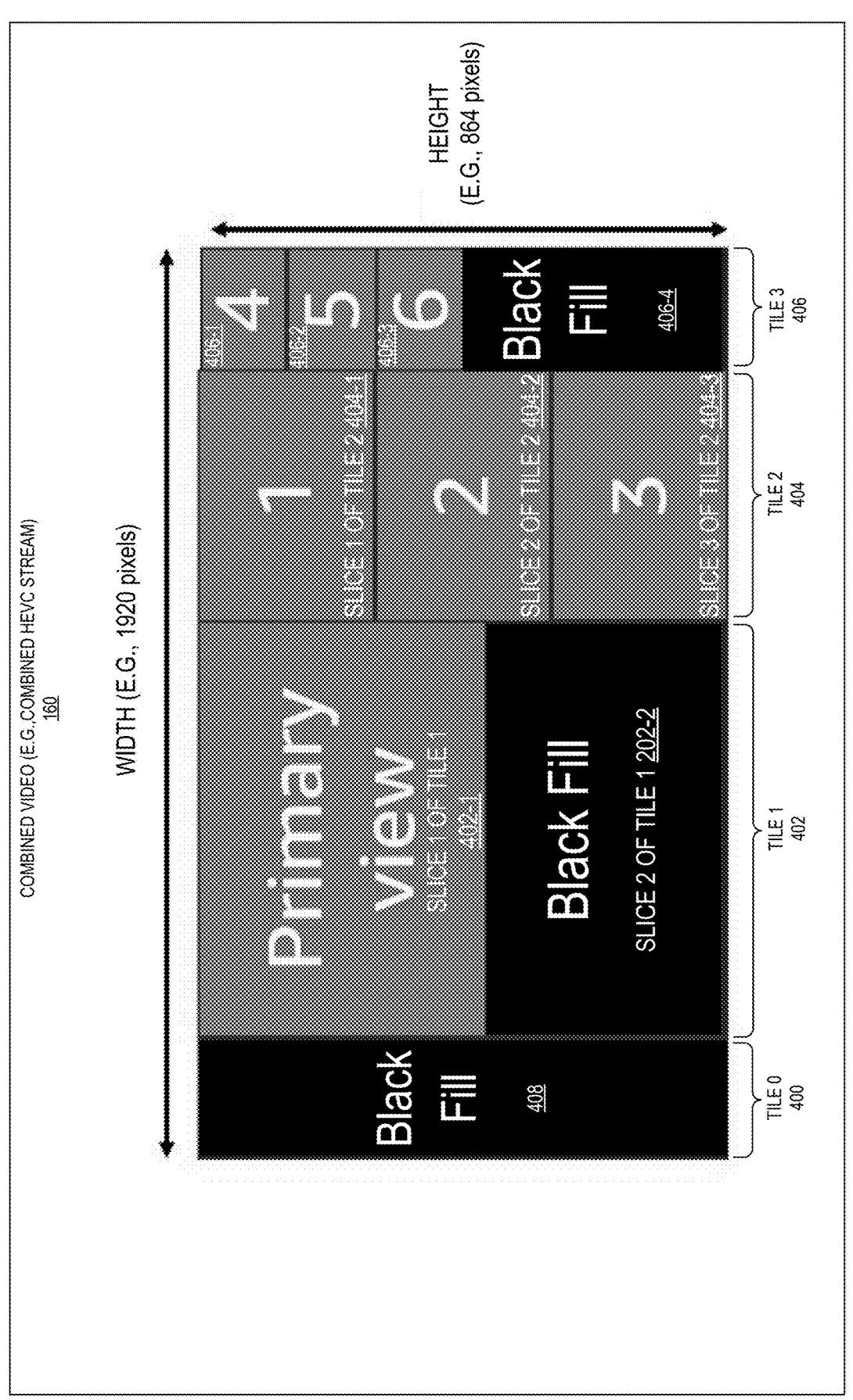
FIG. 4 is a diagram illustrating a template of a combined video having a slice for a primary video, and first, second, and third slices for other videos according to some examples.

In certain examples, the client device 150 (e.g., media player thereof) is switchable between a "multiple (e.g., mosaic) view" mode (for example, to generate the combined video 160 from multiple source videos, e.g., as shown in FIG. 4) and a "single view" mode (for example, to generate a single video from a single source video). In certain examples, the client device 150 (e.g., media player thereof) includes a user interface to allow the client to select the mode and/or select one or more video streams for display.

In certain examples, the client device 150 (e.g., video (e.g., bitstream) modifier 152 thereof) is to ensure motion vectors are (e.g., only) directed within a corresponding video of the plurality of stitched together videos.

In certain examples, digital rights management (DRM) (e.g., that manages the legal access to digital content) is modified to allow the stitching together of two video streams into a single stitched video, for example, such that DRM is enabled for each respective stream.

Certain examples herein are directed to a light-weight bitstream parsing and re-encoding/rewriting on players/devices with additional constraints during video encoding to allow for multiple video streams to be displayed during playback (e.g., via "bitstream stitching").

In certain examples, the multiple (e.g., HEVC) video streams 108-1 to 108-N are encoded separately and then combined at the client device 150 by video combiner 158 (e.g., using a bitstream stitching algorithm), resulting in a single stream that can be decoded by a single (e.g., HEVC) decoder 162.

Encoder Constraints for Bitstream Stitching

In certain examples, to ensure successful bitstream stitching that results in a (e.g., standard-compliant) (e.g., HEVC) stream, specific constraints are imposed on the (e.g., HEVC) encoder and/or decoder. In certain examples, these constraints can be categorized into three main groups: maintaining consistency across streams, preventing artifacts after merging, and avoiding prediction errors.

In certain examples, consistency across streams is crucial for seamless stitching. In certain examples, the parameter set values (such as chroma_idc, bit_depth_luma, init_qp_minus26, and log2_min_luma_coding_block_size_minus3) are to be uniform across all input streams to prevent conflicts during the merging process. For example, where this uniformity ensures that the stitched video maintains consistent quality and encoding parameters throughout.

In certain examples, to prevent artifacts in the merged stream, certain restrictions are necessary. In certain examples, vertical conformance cropping windows are not allowed in the original streams, as they cannot be signaled for individual videos once merged. In certain examples, in-loop filtering across tiles and slices is to be disabled, and input streams are to adhere to the same constraints if tiles are used.

In certain examples, avoiding prediction errors is essential for maintaining the integrity of the stitched video, e.g., where this is achieved by constraining motion vector prediction and sub-pixel interpolation. In certain examples, for prediction units (PUs) at tile boundaries, specific rules govern the selection of motion vector predictors and merge candidates. In certain examples, sub-sample vector selection is restricted for PUs with motion vectors pointing to the edge of the picture to prevent interpolation mismatches.

In certain examples, the encoder constraints collectively ensure that the individual streams can be effectively stitched together without introducing artifacts or compromising the standard compliance of the resulting bitstream.

Merging Video (e.g., HEVC) Streams

In certain examples, once the input streams are encoded according to the specified constraints, the merging process can be executed to create a single, standard-compliant output stream. In certain examples, this process involves modifying specific elements within the Network Abstraction Layer (NAL) units to integrate the multiple streams seamlessly.

In certain examples, the merging process begins with rewriting the VPS to reflect the characteristics of the merged stream, e.g., updating the indicated level to ensure compatibility with the target decoder. In certain examples, the SPS is modified to accommodate the merged video's dimensions, e.g., updating the picture size to match the resulting dimensions from the video mixing process.

In certain examples, the PPS plays a crucial role in the merging process, e.g., it is rewritten to set the dimensions of tiles based on the size of the input streams and the chosen merging pattern. In certain example, this information is vital for the decoder to understand the spatial arrangement of the merged tiles within the final video frame. In certain examples, the slice segment header requires careful modification, e.g., the slice segment address is adjusted to reflect the new position of the slice in the merged video, ensuring correct spatial arrangement. In certain examples, the quantization parameter (QP) for each slice is made consistent across the merged stream, e.g., by updating the slice_qp_delta syntax element when necessary.

In certain examples, by applying these modifications to the VPS, SPS, PPS, and slice segment headers, multiple (e.g., HEVC) video streams are seamlessly combined into a single, standard-compliant output stream. In certain example, this merged stream can be efficiently decoded by a single decoder (e.g., a single standard HEVC decoder) without requiring any further modifications or customizations.

In certain examples, the bitstream stitching technique enables various applications, such as multi-view video streaming, picture-in-picture displays, and video conferencing. In certain examples, by leveraging the flexibility of a video (e.g., HEVC) standard and adhering to the specified encoder constraints and merging techniques, content providers can deliver rich, immersive video experiences while optimizing bandwidth usage and ensuring compatibility with existing playback devices.

Solutions to Dynamic Secondary Content Insertion (DSCI) Challenges in Multiview Streaming As noted above, a technical issue occurs when attempting to insert the secondary content 118 into the combined video 160 for decoding by single decoder 162, for example, where the secondary content 118 has a different fragment (e.g., GOP) structure than the plurality of main content video streams 108-1 to 108-N. In certain examples, the (e.g., encoded) secondary content 118 is dynamically obtained for the client device 150 (e.g., based on the particular device), for example, dynamically obtained from a separate source than the main content video streams 108-1 to 108-N.

Certain examples herein further allow for secondary content 118 (e.g., secondary content video stream) to be combined with one or more of the multiple (e.g., HEVC) video streams 108-1 to 108-N at the client device 150 by video combiner 158 (e.g., using a bitstream stitching algorithm) resulting in a single stream that can be decoded by a single (e.g., HEVC) decoder 162, e.g., ensuring seamless content delivery and maintaining the integrity of the viewing experience.

Figure 2:
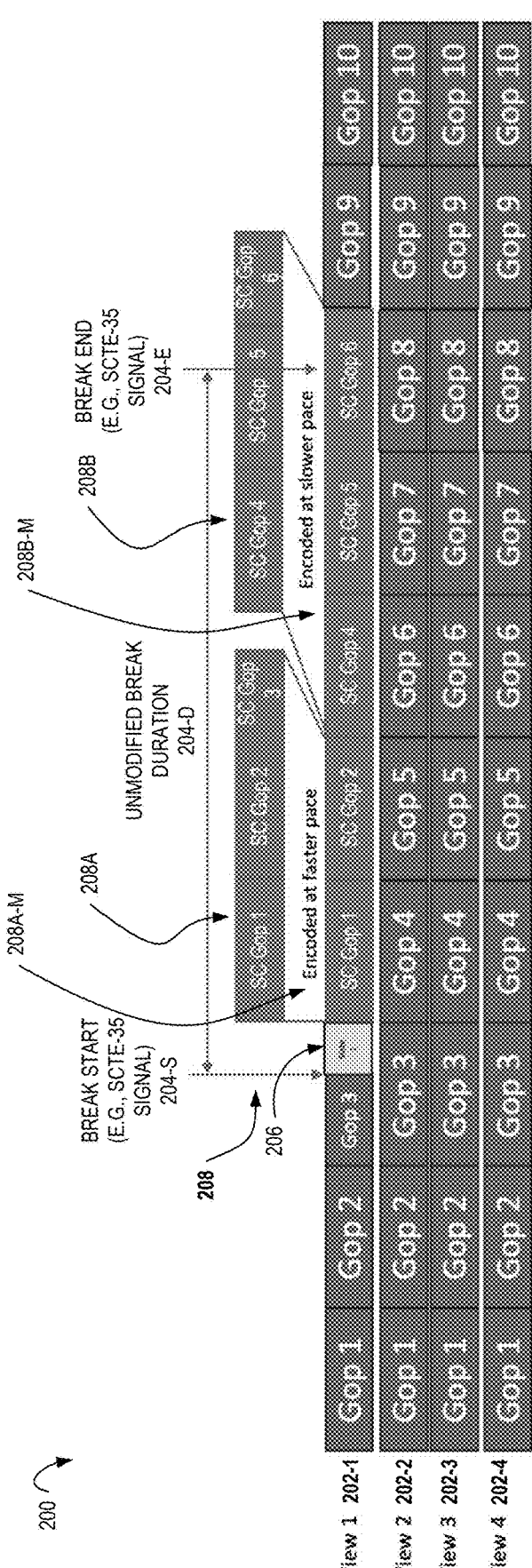
FIG. 2 illustrates multiple streams for simultaneous multiple view video playback including secondary content (SC) inserted into the first view according to some examples.

FIG. 2 illustrates multiple streams (e.g., first view 202-1, second view 202-2, third view 202-3, and fourth view 202-4) for simultaneous multiple view video playback 200 including secondary content (SC) 208 (e.g., a modified version) inserted into the first view 202-1 according to some examples. In certain examples, each GOP of the first view 202-1, second view 202-2, third view 202-3, and fourth view 202-4 is the exact same duration, start time, and end time as the other views. In certain examples, the four streams (view 1 202-1 through view 4 202-4; see, e.g., FIGS. 6-7) represent synchronized playback of different perspectives. In certain examples, the break start 204-S (e.g., SCTE-35) signal triggers secondary content insertion in view 1 202-1, while the other streams continue with their original (e.g., main) content. In certain examples, to address the issue of secondary content start time misalignment, a service/system inserts one or more fill (e.g., slate) I-slices immediately after the break start 204-S (e.g., SCTE-35) signal is received. In certain examples, this I-slice 206 acts as a placeholder until the beginning of the next GOP (shown as GOP 4 in FIG. 4), e.g., ensuring that the secondary content playback starts at a point that aligns with the GOP structure of the other streams.

Additionally, to handle secondary content durations (e.g., unmodified break duration 204-D in FIG. 2) that are not an integer multiple of the fragment (e.g., GOP) duration (e.g., secondary content durations that are not integer seconds), certain examples herein (e.g., of video modifier 152) divide the secondary content 208 into two parts (208A and 208B), and each are encoded at different speeds. In certain examples, the first part 208A of the secondary content (secondary content GOP 1 to secondary content GOP 3) is encoded at a faster pace to reduce playback time, while the latter part 208B (secondary content GOP 4 to secondary content GOP 6) is encoded at a slower pace to extend its duration. In certain examples, this approach adjusts the total secondary content duration to an integer multiple of the fragment (e.g., GOP) duration (e.g., to an integer second), ensuring seamless alignment with the GOP structure. In certain examples, once the secondary content 208 finishes, the service/system (e.g., video modifier 152) transitions back to the main content, starting from GOP 9 in View 1 202-1 in FIG. 2, synchronized with the other streams. This ensures the integrity of the stream structure and maintains a smooth multi-view streaming experience.

Resolving Secondary Content (e.g., Break) Start Time Misalignment

One of the primary challenges in dynamic secondary content insertion for multiview streaming is the unpredictability of secondary content insertion points, e.g., because the content provider (e.g., production crew member) of the live stream selects the secondary content insertion point(s).

In FIG. 2, a break start (e.g., SCTE-35) 204-S signal is received, e.g., but indicates the beginning of the break is within GOP 3 of view 202-1. Thus certain examples herein cannot insert secondary content 208 at that point, e.g., as the other views (second view 202-2, third view 202-3, and fourth view 202-4) would be affected by an attempt to change the functioning of the decoder in decoding (and thus displaying) the first view 202-1.

To address this issue, certain examples herein (e.g., as implemented by video modifier 152 of client device 150 in FIG. 1) delay the actual playback of the secondary content 208 without altering the break start 204-S (e.g., insertion time). In certain examples, this approach involves inserting a plurality of fill (e.g., slate) intra-coded slices (I-slices) 206 into the original video sequence immediately after the break start 204-S (e.g., insertion signal) is received, e.g., up until the end of GOP 3. In one example, the fill frame is a slate frame (e.g., a fixed image). In another example, the fill frame is a last frame of the GOP 3 in view 202-1 before the break start 204-S (e.g., insertion signal). In certain examples, the break start 204-S and/or break end 204-E indications are splice insert commands and/or time signal commands, e.g., according to a SCTE-35 standard. In certain examples, the fill I-slices are intra-coded I-frames, that allow the system (e.g., decoder) to wait until the beginning of the next GOP (what would have been GOP 4 in view 202-1) before initiating the secondary content 208 playback. In certain examples, this ensure that the secondary content 208 starts at a point where it can be seamlessly integrated with the other views' GOP structures.

For instance, if an operator initiates a secondary content insertion in the middle of a GOP, the system will insert fill I-slices 206 to fill the time until the next GOP begins. At this point, the system can combine (e.g., concatenate) the next GOP from each of the other views with the first frame of the dynamic secondary content 208, e.g., effectively resolving the misalignment issue.

In certain examples, this method may introduce a delay of up to one GOP (e.g., one second) before the secondary content begins playing. However, this short delay is a reasonable trade-off in certain examples for maintaining the structural integrity of the video stream and ensuring smooth playback across all views.

Handling "Non-Integer Second" Secondary Content Durations

Another significant challenge is that secondary content durations may not be an integer multiple of the fragment (e.g., GOP) duration (e.g., secondary content durations may not be integer seconds), which can disrupt the fragment structure (e.g., GOP structure) alignment across views. To address this, certain examples herein perform secondary content normalization by encoding (e.g., re-encoding) the secondary content 208 at a slightly faster or slower speed to achieve integer multiple of the fragment (e.g., GOP) duration (e.g., to achieve an integer-second duration). In certain examples, a first portion 208A of the secondary content 208 is sped up to form modified portion 208A-M (e.g., secondary content (SC) GOPs 1-3 are sped up to form modified secondary content GOP 1 which is inserted into the slot of former GOP 4 in view 202-1, and modified secondary content GOP 2 which is inserted into the slot of former GOP 5 in view 202-1. In certain examples, a second portion 208B of the secondary content 208 is slowed down to form modified portion 208B-M (e.g., secondary content (SC) GOPs 4-6 are slowed down to form modified secondary content GOP 4 which is inserted into the slot of former GOP 6 in view 202-1, modified secondary content GOP 5 which is inserted into the slot of former GOP 7 in view 202-1, and modified secondary content GOP 6 which is inserted into the slot of former GOP 8 in view 202-1).

In certain examples, the time-warped interpolation or down sampling is performed during the encoding process. For example, a 15.5-second secondary content could be normalized to a 15-second duration, effectively speeding up the secondary content by 0.5 seconds. While this process does affect the secondar content's visual and audio components, the impact is typically negligible in certain examples. In certain examples, the secondary content is longer than 15 seconds, and thus the maximum adjustment is usually less than 0.5 seconds. This results in a speed adjustment of approximately 3.33% (0.5/15), which is generally imperceptible to viewers, especially without a direct comparison.

In certain examples, the speed adjustments are chosen so as to be difficult for viewers to detect, whether in comparative or non-comparative viewing scenarios. This approach allows for maintaining secondary content integrity while ensuring that all secondary content align with the fragment (e.g., integer-second) durations, facilitating seamless stitching of multiple secondary content and alignment with the GOP structures of other views. In certain examples, a secondary content provider can set a threshold for speeding up and/or a threshold for slowing down of their secondary content during presentation. In certain examples, a secondary content provider can indicate a certain portion (e.g., less than all) of the secondary content to not be sped up and/or not be slowed down.

Managing the Transition from and Back to Main Content for Secondary Content

In certain examples, the transition from and/or back to the main content after the secondary content is presented leads to another challenge due to the cumulative effects of the previous adjustments.

In certain examples, the actual beginning time (shown as the beginning of GOP 4 for the original content which is now the beginning of modified SC GOP 1) for the inserted secondary content (208A-M and 208B-M) differs from the original secondary content insertion signaled time (e.g., break start 204-S).

To manage this transition, certain examples herein do not display (e.g., they discard) the portion of the main content between the original secondary content insertion signaled time (e.g., break start 204-S) and the actual transition point (shown as the beginning of GOP 4 for the original content which is now the beginning of modified SC GOP 1). In certain examples, this approach ensures that playback of the secondary content (e.g., after the fill frame(s) 206) begins at the beginning of a main content GOP, e.g., maintaining the structural integrity of the video stream. In certain examples, while this results in the loss of a small portion of the main content, it guarantees smooth playback and consistent GOP structure across all views, which is crucial for the overall viewing experience in a multiview streaming context.

In certain examples, the actual end time (shown as the end of GOP 8 for the original content which is now the end of modified SC GOP 6) for the inserted secondary content (208A-M and 208B-M) differs from the original secondary content insertion signaled end (e.g., break end 204-E), e.g., where the end of the inserted (modified) secondary content coincides with the beginning of the next GOP (shown as the beginning of GOP 9 in view 202-1).

To manage this transition, certain examples herein do not display (e.g., they discard) the portion of the main content between the original secondary content insertion signaled end (e.g., break end 204-E) and the actual transition point (shown as the end of GOP 8 for the original content which is now the end of modified SC GOP 6). In certain examples, this approach ensures that playback of the main content of first view 202-1 resumes at the beginning of a GOP (shown as GOP 9 in FIG. 2), e.g., maintaining the structural integrity of the video stream. In certain examples, while this results in the loss of a small portion of the main content, it guarantees smooth playback and consistent GOP structure across all views, which is crucial for the overall viewing experience in a multiview streaming context.

Certain examples herein do display (e.g., they do not discard) the portion of the main content between the original secondary content insertion signaled end (e.g., break end 204-E) and the actual transition point (shown as the end of GOP 8 for the original content which is now the end of modified SC GOP 6), e.g., by shifting (e.g., the post signaled end portion of) GOP 8 of the original content to now be displayed in the slot that was originally for GOP 9 of the original content.

Addressing Frame Rate Discrepancies Between Secondary Content and Main Content

In certain examples, there is a frame rate mismatch between the secondary content (e.g., at 30 fps) and the main content (e.g., at 60 fps). This discrepancy can lead to inconsistencies in GOP structure and the Reference Picture Set (RPS) construction.

Certain examples herein convert the lower frame rate video to match the higher frame rate through a frame duplication technique. Certain examples herein insert a skip P-frame in the secondary content after each of a certain number of original frames in the secondary content to make the lower frame rate of the secondary content match the higher frame rate of the main content, for example, adding a skip P-frame into the secondary content after each original frame of the secondary content. In certain examples, these skip P-frames have several key characteristics: each Coding Tree Unit (CTU) is skipped, they contain no motion vectors, and/or they point to the same reference picture as the preceding frame.

To implement this conversion effectively, certain examples herein use specific GOP structures for both frame rates of the secondary content and the main content. In certain examples, for the main (e.g., 60 fps) content, a 4-frame mini-GOP structure of IPBBBPBBB is utilized. In certain examples, for the secondary (e.g., 30 fps) content, a 2-frame mini-GOP structure of IPBPBPB is used.

However, in certain examples this conversion method may not be universally applicable to all secondary (e.g., 30 fps) content. In certain examples, the viability of the conversion depends on the resulting reference picture structure avoiding conflicts between views. For example, if Frame A references Frame B in the original structure, the conversion is not to cause a situation where Frame B references Frame A, as this would create an unresolvable circular dependency.

By carefully designing the GOP structures and applying this frame duplication technique, certain examples herein effectively convert secondary content's frame rate (e.g., 30 fps) to main content's frame rate (e.g., 60 fps), allowing for seamless integration with the main content while maintaining consistent GOP structures and RPS across all views.

This comprehensive approach to addressing the challenges of dynamic secondary content insertion in multiview streaming systems enables content providers to deliver a more seamless and engaging viewing experience while effectively presenting targeted secondary content to the client (e.g., viewer).

Solutions for the Challenges of Burned-In Secondary Content in Multiview Streaming In certain examples, the integration of burned-in secondary content within a multiview streaming system introduces specific challenges, particularly concerning the reference picture set (RPS) discrepancies and GOP misalignment that occur due to the insertion of Instantaneous Decoder Refresh (IDR) frames triggered by the break (e.g., SCTE) signal.

Figure 3:
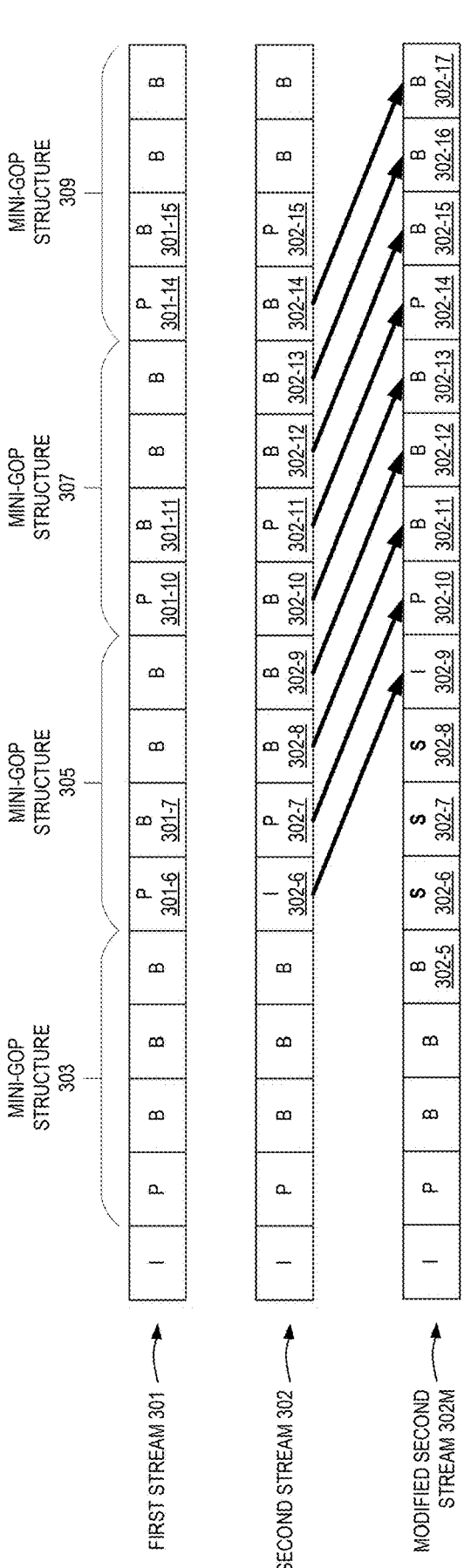
FIG. 3 illustrates a first stream and second stream for simultaneous multiple view video playback including skip (S) frames inserted into the second stream according to some examples.

FIG. 3 illustrates a first stream 301 and second stream 302 for simultaneous multiple view video playback including skip(S) frames inserted into the second stream 302M according to some examples. Depicted first stream 301 includes an I-frame followed by a plurality of mini-GOP structures 303, 305, 307, and 309, e.g., with each mini-GOP having a PBBBPBBB pattern.

In certain examples, second stream 302 (e.g., for multiview) initially includes a corresponding (e.g., having the same display time as the I-frame in the first stream 301) I-frame followed by a corresponding (e.g., having the same display time as the remaining frames in the first stream 301) plurality of mini-GOP structures, e.g., with each mini-GOP having a PBBBPBBB pattern. However, in certain examples when a break (e.g., SCTE) signal triggers the insertion of an IDR frame 302-6, it disrupts the existing mini-GOP structure, e.g., the PBBBPBBB pattern.

In certain examples, this disruption leads to inconsistencies in the RPS of the frames leading up to the IDR insertion. To mitigate this, certain examples herein modify (e.g., reconfigure) the slice headers of these frames to ensure that their RPS aligns correctly with the newly merged structure. In certain examples, this involves adjusting the RPS (e.g., short-term reference picture set (STRPS)) of the merged frame to include a union of all reference pictures from each individual frames. FIG. 12 is an example of reference picture list modification semantics 1200 for including multiple videos for simultaneous viewing according to some examples. In certain examples, modifying the relevant (e.g., short-term reference) flags within the slice headers accordingly ensures that the reference structure remains intact. In certain examples, for each individual slice, the num_ref_idx_active_override_flag is enabled to allow the modification of active reference indices, while the ref_pic_list_modification_flag_10 1202 and ref_pic_list_modification_flag_11 1204 are set accordingly to reflect the updated reference picture lists (RPL). In certain examples, these adjustments ensure that the frames before the break (e.g., SCTE) signal maintain a coherent and consistent reference picture set, preventing potential playback disruptions.

Additionally or alternatively to resolving the post-IDR frame challenges, certain examples herein solve the potential GOP misalignment that occurs after the IDR frame insertion. In certain examples, although both secondary content inserted and non-secondary content inserted streams initially adhere to a PBBBPBBB cadence, the break (e.g., SCTE) signal can cause a desynchronization of this cadence, for example, whereas display slot six in first stream 301 is a P-frame 301-6, but the same display slot six in the second stream 302 after IDR insertion is IDR frame 302-6; display slot seven in first stream 301 is a B-frame 301-7, but the same display slot seven in the second stream 302 after IDR insertion is P-frame 302-7; display slot ten in first stream 301 is a P-frame 301-10, but the same display slot ten in the second stream 302 after IDR insertion is B-frame 302-10, display slot eleven in first stream 301 is a B-frame 301-11, but the same display slot ten in the second stream 302 after IDR insertion is P-frame 302-11, etc. In certain examples, the corresponding slots not having the same type of frame (e.g., B-frame or P-frame) causes issues in the RPS as the stitched together frame in multiview is not referencing the same reference frame(s). To correct this, certain examples herein introduce an (e.g., slight delay) alignment offset (e.g., ranging from zero to a threshold (e.g., three) of frames in the secondary content-inserted stream), for example, whereas display slot ten in first stream 301 is a P-frame 301-10, now the same display slot ten in the modified second stream 302M after skip frame insertion is a P-frame 302-10; display slot eleven in first stream 301 is a B-frame 301-11, now the same display slot eleven in the modified second stream 302M after skip frame insertion is a B-frame 302-11; display slot fourteen in first stream 301 is a P-frame 301-14, now the same display slot fourteen in the modified second stream 302M after skip frame insertion is a P-frame 302-14; display slot fifteen in first stream 301 is a B-frame 301-15, now the same display slot fifteen in the modified second stream 302M after skip frame insertion is a B-frame 302-15; etc. In certain examples, this alignment offset realigns the mini-GOP structures across all views, ensuring that the RPS of the secondary content-inserted stream matches that of the non-secondary content streams. To handle the minor temporal gap created by this delay, certain examples herein insert "skip-P" slices 302-6, 302-7, and 302-8 of the last pre-secondary content frame 302-5 (e.g., referred to as "frozen slices") to form modified second stream 302M. In certain examples, these repeated slices fill the gap without notice-able disruption to the viewer, as the delay is minimal (e.g., approximately 0.05 seconds in a standard 60 fps video).

In certain examples, at the end of the GOP, any excess B-frames in the secondary content inserted stream 302M, resulting from the delay, can be discarded without affecting the compliance of the video stream. In certain example, to accommodate the dropping of these frames, the RPS in the slice headers of the merged frames is adjusted by recalcu-lating the POC distances, so that it points to the correct reference, e.g., to ensure that the reference frames are correctly identified and maintain the integrity of the stream in compliance with the video (e.g., HEVC) standard.

By implementing these targeted adjustments, certain examples herein effectively address the challenges posed by burned-in secondary content, ensuring smooth playback and consistent quality across all views in a multiview streaming environment.

Additional Video Bitstream Stitching Techniques for Mul-tiview

Although it should be understood that the above second-ary content insertion may be utilized with other video (e.g., bitstream) stitching techniques, the following discusses examples of particular video (e.g., bitstream) stitching tech-niques for the simultaneous displaying and/or viewing of a plurality of streamed videos while allowing for the insertion of secondary content, for example, the simultaneous dis-playing and/or viewing via a single decoder of a single device of the plurality of streamed videos where at least one video includes inserted secondary content.

Certain examples herein are directed to a computer-implemented service (e.g., of a video streaming platform) and/or device (e.g., client device) (e.g., non-transitory com-puter-readable medium stored on the device) that allows for the simultaneous displaying and/or viewing of a plurality of streamed videos. In certain examples, it is the device (e.g., client device) that modifies the bitstream's parameters to place multiple videos as respective tiles in a single frame for decoding by a single decoder. These modified parameters may include those in a Sequence Parameter Set (SPS), Picture Parameter Set (PPS), and Slice Segment Header (SSH). The modifications may include causing each video stream of the combined video to have a same coding tree unit (CTU) size.

The rapid growth of sporting events and the improvement of video production quality will likely lead to an increased demand for multiple view (multiview) streaming that enables viewers to watch different camera feeds of the same live event or different live events simultaneously. This allows users to access multiple perspectives of an event concurrently, choosing from various camera angles or per-spectives of the same live event, such as a football game or a concert, while also having the option to watch different live events side by side. Multiview streaming offers users the ability to customize their viewing layout, arranging video feeds in various configurations and switching the audio feed to correspond with a specific video feed. However, as audiences seek to access multiple perspectives, certain streaming practices, primarily designed for delivering a single video stream, face challenges in accommodating this demand due to the limited number of decoders supported by most existing devices.

The following discusses two solutions for implementing multiview. The first involves handling the multiview capa-bility in the cloud, e.g., where multiple video streams are processed and combined into a single stream at the server side before being transmitted to the client. This centralized approach may allow for easy management and distribution of the multiview content but lack flexibility as the combi-nations of views are fixed and predetermined, leading to a "combinatorial explosion" problem when providing a large number of combinations. The second relies on multiple decoders on the client side, enabling the simultaneous decoding of several streams. This approach offers greater flexibility as users can choose their desired combination of views in real-time, but it is constrained by device capabili-ties, particularly in mobile and low-end devices, which may not support multiple decoders due to cost and power con-sumption considerations.

Certain examples herein are directed to "bit-stream stitch-ing" that combines multiple (e.g., High Efficiency Video Coding (HEVC)) streams into a single stream at the client-side before decoding, e.g., without the need for decompres-sion. In certain examples, a goal of bitstream stitching is to reduce the computational effort required and maintain com-pliance with a streaming (e.g., HEVC) standard, e.g., allow-ing the stitched stream to be decoded by a single decoder. However, a bit-stream stitching solution may not be directly applicable to real-world live video streaming scenarios. Two fundamental issues have emerged. Firstly, the robustness of live streaming systems is a critical concern. In situations where an encoder fails, resulting in the loss of a stream, the viewing experience can be significantly disrupted. While traditional single-stream setups may mitigate this problem through buffering or switching to an alternate source, mul-tiview streaming using bitstream stitching is more vulner-able to such issues. The loss of a single stream, e.g., which may occur frequently under protocols designed for ultra-low latency, can render the stitching method ineffective. If any part of the combined stream is missing, reconstructing the complete view becomes impossible in certain examples. For example, if one out of four views is lost, the remaining three cannot be displayed as the system fails to merge them into a cohesive output. Therefore, error handling and robustness in the face of packet loss and encoder failures are paramount in these systems.

Secondly, adaptive bit rate streaming in live broadcasts presents another challenge for bitstream stitching methods. In certain examples, the video's bitrate and resolution are to be adjusted dynamically based on network conditions. If the resolution of one or more video streams changes during the adaptation process, it poses a significant problem for certain bitstream stitching approaches. These methods may not account for situations where the resolution of individual views vary during a live event, leading to difficulties in maintaining the continuity and quality of the video output. The lack of flexibility in handling resolution changes can disrupt the seamless integration of multiple video streams, necessitating a more adaptable design approach to accom-modate real-time resolution and bit rate variability among different video feeds. To address the challenges identified in certain bitstream stitching approaches, certain examples herein significantly improve the robustness and flexibility of this technology for real-world live streaming applications by using one or both of two key enhancements: (1) a skip key frame technique that mitigates the impact of packet loss by replicating previous frames when a view is lost or corrupted (e.g., creating a freeze effect instead of a complete break-down) (e.g., where the implementation of skip key frames maintains the continuity of the stream in the event of view loss and/or helps preserve the dynamic composition of the video), and (2) a flexible layout technology that enables the seamless combination of video streams with varying resolutions, e.g., ensuring effective stitching despite changes in video resolution during a live event. These enhancements create a bitstream stitching solution that is resilient and adaptable, and provides a robust framework for delivering Multiview streaming in real-world scenarios (e.g., by the application of flexible layouts that accommodate adaptive bitrate (ABR) resolution changes and/or ensure a seamless stream integration despite varying resolutions).

Certain (e.g., HEVC) bitstream stitching techniques aim to merge different video streams into a single coherent stream by imposing a set of constraints on the HEVC encoder. In certain examples, these constraints are designed to ensure that the encoded video streams are compatible for seamless stitching. In certain examples, the stitching process involves modifying key flags in the Video Parameter Set (VPS), Sequence Parameter Set (SPS), Picture Parameter Set (PPS), and/or segment headers of the video streams. By adhering to these constraints during the encoding process and performing the necessary flag modifications, the resulting stitchable video streams can be effectively combined into a unified stream in certain examples.

To implement a practical and robust video streaming solution, the following technical challenges need to be addressed in certain examples: (1) error handling to ensure an acceptable user experience in the event of packet loss or encoder failure in one of the video streams, (2) layout flexibility to support various layout configurations, such as 2×2 or 1×3 grid views, allowing for multiple concurrent video streams to be displayed simultaneously, and/or (3) adaptive bitrate streaming, e.g., even when network conditions fluctuate.

The examples herein provide technical solutions to these technical problems by enhancing video stitching capabilities for error handling, flexible layouts, and/or adaptive bitrate streaming. Certain examples herein provide technical solutions to these technical problems by extending video stitching to (1) insert a fill region (e.g., black slices) and/or a fill image (for example, a frame from one of the multiple videos, e.g., by inserting all-skip Coding Tree Units (CTUs)) to handle error (e.g., packet loss and/or buffering) events, e.g., enabling a freezing effect by the fill image, (2) enable flexible layout positioning and sizing of multiple video views within device decoding constraints, and/or (3) introduce adaptive bitrate streaming through careful view resolution and padding design, e.g., implementing adaptive bitrate (ABR) ladder switching to ensure smooth playback by adjusting the video quality dynamically. The examples herein ensure a seamless and high-quality user experience.

Certain examples herein deliver a multiple view experience for streaming video customers where they can see different videos (e.g., different camera feeds of a single event or different events (e.g., different games)) on the screen simultaneously. Instead of relying on multiple decoders (e.g., one per video feed) which certain devices do not support, certain examples herein implement a novel algorithm that efficiently merges multiple video streams into a single stream that only utilizes one decoder, e.g., enabling multiple view on devices with single decoder capabilities.

Other examples may utilize a method that merges multiple video bitstreams together on a content provider's servers before sending the merged stream to the client (e.g., user), but this merging process requires expensive overhead on those servers, which limits the number of personalized bitstream combinations that can be created for each user (e.g., only providing a limited selection of pre-merged streams for users to choose from, reducing customizability for the end user, and providing a poorer customer experience). The expensive server requirements of this merging method also make it difficult to scale and deliver a truly customized experience to each viewer. In contrast to this method, certain examples herein implement a novel algorithm that efficiently merges multiple video streams into a single stream on the client device side.

An alternative approach is using a multi-decoder/player system. With this approach, a client (e.g., user) use one decoder for each video stream displayed, and multiple decoders for multiple view. However, this approach has high resource requirements for client devices, which could limit access for many users. Adopting a multi-decoder system would thus significantly reduce the number of customers able to utilize the service due to the increased client-side processing needs. In contrast to this approach, certain examples herein implement a novel algorithm that efficiently merges multiple video streams into a single stream that only needs one decoder, e.g., enabling multiple view on devices with single decoder capabilities.

Certain examples herein combine multiple videos into a single stream according to a video standard (e.g., a High Efficiency Video Coding (HEVC) standard), e.g., through tiles and slices. In certain examples, a (e.g., rectangular) tile (e.g., according to a HEVC standard) is an independent portion of a frame (e.g., picture), e.g., to allow parallel processing (e.g., decoding) of multiple tiles. In certain examples, a (e.g., rectangular) tile (e.g., according to a HEVC standard) is divided into slices, e.g., where each slice does not rely on another slice for prediction. Certain examples herein combine multiple videos into a single stream according to a video standard (e.g., a High Efficiency Video Coding (HEVC) standard) by modifying video parameters (e.g., header information) (e.g., according to a HEVC standard) and arranging the video data packets from separate streams to manipulate a video player (e.g., operating according to a HEVC standard) into seamlessly decoding multiple videos together as if they were from one stream encoded by one encoder (e.g., but are multiple streams encoded by multiple encoders). This merging of videos avoids quality loss and the need for expensive specialized software and/or hardware to combine the streams. Certain examples herein provide an efficient way to deliver multiple videos in a single stream using video compression and playback tools (e.g., according to a HEVC standard), e.g., by manipulating the encoder settings discussed herein. Certain examples herein strategically manipulate (e.g., HEVC) syntax elements and (e.g., minimally) modify undecoded bitstreams to combine multiple videos into one stream that is decodable by a client's device (e.g., according to a modified HEVC standard). By identifying and changing key flag locations in (e.g., HEVC) parameter sets, certain examples herein merge streams with minimal processing. Certain examples herein innovatively employ (e.g., HEVC) features like slices, tiles, padding, and a conformance window to achieve robust performance against packet loss and flexible multi-resolution layouts in the merged stream. Certain examples herein enable efficient compression and seamless viewing experiences for merged videos with tweaking of (e.g., HEVC) bitstream parameters.

Certain examples herein allow a single (e.g., HEVC) decoder to decode a stitched video to allow for the (e.g., original) video streams to be displayed side-by-side. Certain examples herein create a flexible layout method for videos with arbitrary resolutions, e.g., by inserting fill images (e.g., fill frames) and/or padding the video to merge videos of multiple resolutions (e.g., any resolutions). Certain examples herein are directed to an algorithm and mechanism to handle packet loss and rebuffering, e.g., using skipped predicted (P) copy frames and/or duplicate instantaneous decoder refresh (IDR) frames.

Encoding Constraints Verification

In certain examples, bitstream stitching (e.g., in a HEVC bitstream) merges encoded video streams. In certain examples, tiles in HEVC, while independent within a frame, can depend on tiles from previous frames. If tiles are altered during stitching, it can lead to decoding errors. Thus, certain examples herein utilize encoder constraints to manage these dependencies and ensure error-free stitching.

To ensure that the bitstream stitching process results in a mixed video that remains compliant with an (e.g., HEVC) standard and can be correctly decoded by a decoder operating under an (e.g., HEVC) standard, certain examples herein impose a set of constraints on an (e.g., HEVC) encoder. These constraints can be grouped into several categories based on their purpose: maintaining consistency across streams, preventing artifacts after merging streams, and avoiding prediction errors.

In certain examples, maintaining consistency across streams is crucial for successful bitstream stitching. Certain parameter set values, such as, but not limited to, chroma_idc and bit_depth_luma, are to be consistent across all input video streams to avoid conflicts during the stitching process. Certain parameter set values, such as, but not limited to, all init_qp_minus26 and log2_min_luma_coding_block_size_minus3 flags, in the Sequence Parameter Set (SPS) and Picture Parameter Set (PPS) should also be consistent across the input streams. This ensures that the mixed video maintains a uniform quality and prevents any discrepancies in the encoding parameters.

In certain examples, preventing artifacts after merging streams is another important aspect of the encoder constraints. First, in certain examples, no conformance cropping window can be present in the original streams, as it cannot be signaled for each video once they have been merged. Second, in certain examples, in-loop filtering across tiles and slices is to be disabled, and the input streams are to have the same constraints if tiles are used. These constraints ensure that the merging process does not introduce any visual artifacts or inconsistencies in the mixed video.

In certain examples, avoiding prediction errors is essential for maintaining the integrity of the mixed video. This can be achieved by constraining motion vector prediction and/or sub-pixel interpolation. In certain examples, for prediction units (PUs) at the (e.g., right_border of tiles, the merge index (merge_idx) should not point to a candidate that is not a neighbor candidate in the absence of a temporal candidate and may only point to the zero candidates if a temporal candidate exists (e.g., if the collocated PU is used for temporal motion vector prediction (TMVP)). Additionally, for non-skip/merge mode, certain flags (e.g., mvp_10_flag/ mvp_11_flag) should not point to a zero vector directly following a neighbor predictor or a zero vector that is the first of all candidates, which may happen in the absence of a temporal candidate. These constraints prevent issues related to motion vector prediction at tile boundaries.

In certain examples, encoders should constrain the sub-sample vector selection for prediction units in which motion vectors point to the edge of the picture, e.g., encoders should not select sub-sample motion vectors that point to samples that lie within the sample position (x, y) with x or y within the interval [0, 2], x within the interval [PicWidth-4, PicWidth-1], or y within the interval [PicHeight-4, PicHeight-1]. In certain examples, encoders are to constrain the possible values of motion vectors to ensure they do not point to non-existent samples outside the picture boundaries. In certain examples, the selected motion vectors are to not point to luma samples (x, y), for which x does not lie within the interval [0, PicWidth-1] and y does not lie within the interval [0, PicHeight-1]. These constraints help avoid sub-pixel interpolation mismatches and ensure accurate prediction during the decoding process.

In certain examples, intra frames do not require any additional constraints since no dependencies exist between the different tiles.

By adhering to one or more (e.g., all) of these encoder constraints, the bitstream stitching process can be performed seamlessly, resulting in a mixed video that is compliant with a (e.g., HEVC) standard and can be correctly decoded by a decoder operating under a (e.g., HEVC) standard.

Modified Candidate Lists in Advanced Motion Vector Prediction (AMVP) and Merge

In certain examples, a prediction unit (PU) specifies all the prediction modes of the coding unit, e.g., including all prediction-related information (e.g., intra prediction direction, inter prediction division method, motion vector prediction, and/or inter prediction reference image index number, etc.). In certain examples, a PU is the basic unit for prediction.

In certain (e.g., HEVC) encodings, a temporal candidate (e.g., "H") can point outside the current PU or tile. In certain examples, after reassembly, altering a tile adjacent to the original can cause decoding errors if predictions point to it, especially near tile boundaries where motion vectors should avoid different reference tiles. In certain examples, predictions from other tiles are disabled. In certain examples, not all temporal candidates are removed.

Limit Motion Vector Proximity to Edges

In certain (e.g., HEVC) encodings, issues arise with sub-pixel interpolation when motion vectors target areas close to picture borders. In certain examples, when videos are stitched together, new samples appear at the original boundaries, creating discrepancies between the encoder and decoder. To ensure uniformity, certain examples herein (e.g., decoders thereof) do not use motion vectors near these borders, e.g., to keep the motion vectors at least a defined distance from the edge.

Slice and Tile Constraints

In certain (e.g., HEVC) encodings, motion vectors can cross tile or slice boundaries. But after rearranging the tiles, the information in these motion vectors reference might change. To ensure the decoder has consistent information, in certain examples the encoder search range is limited near tile boundaries. In certain examples, the size of the PU is considered at the tile boundary to prevent it from crossing the tile boundary.

Ensure Consistent Group of Pictures (GOP) Structure

Encoding (e.g., by content provider service/system 104 and/or content delivery service/system 106) may compress a video file (e.g., input frame(s)) into a plurality of compressed frames, for example, one or more an intra-coded picture frames (I-frames) (e.g., with each I-frame as a complete image), one or more predicted picture frames (P-frames or delta-frames) (e.g., with each P-frame having only the changes in the image from the previous frame), and/or one or more bidirectional predicted picture frames (B-frames) (e.g., that further saves space (e.g., bits) by using differences between the current frame and the preceding and/or following frames to specify its content). For example, with P-frames and B-frames being inter-coded pictures. In one example, each single I-frame corresponds to (e.g., is associated with) a plurality of inter-coded frames (e.g., P-frames and/or B-frames), e.g., as a group of pictures (GOP). In certain examples, an encoder selects one or more prediction styles for a slice (e.g., a sequence of macroblocks), for example, switching I (SI) frame (e.g., slice) that facilitates switching between coded streams (e.g., containing SI-macroblocks as a special type of intra coded macroblock and/or switching P (SP) frame (e.g., slice) that facilitates switching between coded streams (e.g., containing contains P and/or I-macroblocks). In certain examples, a slice can be a whole frame, e.g., but it is not required that a whole frame be a slice.

In one example, stitching of two video streams is accomplished by requiring (e.g., and indicating an error indication (e.g., fault) otherwise) a picture order count (POC) of a first group of pictures (GOP) of a first video stream match a picture order count (POC) of a second group of pictures (GOP) of a second video stream to allow for simultaneous viewing. In certain examples, this means that the POC numbers match (e.g., if a first GOP has POC values of 1, 2, 7, and 4 for its four frames then the second GOP has the same POC values of 1, 2, 7, and 4 for its different four frames), but the actual frames corresponding to the POC numbers do not match (as would be expected since there are frames for the first video stream and different frames for the second video stream). In another example, stitching of two video streams is accomplished by requiring (e.g., and indicating an error indication (e.g., fault) otherwise) indices for a reference picture set (RPS) (e.g., where frames 5 and 11 are used as reference pictures for a GOP) (for example, an RPS in a reference picture buffer, e.g., reference picture buffer in encoding service 126 and/or decoder 162) of a first group of pictures of the first video stream match indices for a reference picture set of a second group of pictures of the second video stream for simultaneous viewing. In certain examples, if a first GOP of a first video stream has indices for its reference picture set (RPS) of 1, 2, and 3, and a second (e.g., corresponding) GOP of a second video stream has indices for its reference picture set (RPS) of 1, 2, and 4, a superset of those indices (1, 2, 3, and 4) is used, e.g., the parameter set modifier 154 is to modify the RPS for the combined GOP to be the superset of those indices (1, 2, 3, and 4). Although the above discusses two streams, it should be understood by one of ordinary skill in the art that this is extensible to three or more streams that are being stitched together for simultaneous viewing according to this disclosure.

In certain examples, to guarantee the reference picture set's (RPS's) availability in a decoded picture buffer (DPB) (e.g., in decoder 162), synchronizing of IDR frames between the plurality of streams being combined is essential. In certain examples, the stitching of two video streams uses a single uniform GOP structure for all streams that are to be stitched together.

In certain examples, stitching of two video streams uses IDR synchronization alone, e.g., given that P and B frames can be swapped, provided they utilize the same RPS. In certain examples, stitching of two video streams uses unsynchronized IDR.

Ensure Uniform CTU Size Among Streams

In certain examples, to ensure all streams are stitch-able, they are to have the identical CTU sizes, e.g., via a "CTU" setting that allows the control of CTU size.

Other Encoding Constraints

In certain examples, one or more of the following constraints in Table 1 are utilized to allow for video stitching according to this disclosure.

TABLE 1

| Coding Constraints | | |
| --- | --- | --- |
| Constraint | Explanation | Coding setting |
| Motion vector | Restrict to picture boundaries, disable temporal predictor | -mvrestrict |
| Slice = tile | Each tile can only contain single slice, for convenience, can restrain each frame to single slice. | -slice 1 |
| GOP structure | Make streams to be stitched have identical GOP structures, so when frame-by-frame stitching, always stitch a B frame with a B frame, P frame with a P frame, rather than stitch an I frame with a P frame, which may be difficult. | Use the same -gc structure (such as -gc 1 120 2 for a 120 frame GOP w/2 B frames) on every encode and they will be the same. In certain examples, do not enable things like scene change detection (-scd) or dynamic b frames (-dynb) as they will change the structure. Disable b reference (-bref) |
| open/close GOP | GOP closed | -cgcad <cadence>: Set the closed GOP cadence. Each <cadence> GOP is closed. Does not include forced GOPs from a scene change. 1 == All GOPs are closed. |
| CTU size | Ensure all streams have the same CTU sizes | -ctu to set the coding tree unit size(s), and/or -ctb to set the coding tree block (CTB) size. For example -ctb 32 |

TABLE 1-continued

|  | Coding Constraints | |
| --- | --- | --- |
| Constraint | Explanation | Coding setting |
| Other parameters | Ensure other VPS SPS PPS parameters are the same | -minspeed 0 (needed when the videos are encoded with different -speed parameters.) So if all the streams are being encoded at the same speed setting there is nothing to do, the minspeed as you say defaults to the speed setting and all will be good. However, if you start adding UHD that gets encoded at speed 0.5 so then -minspeed 0 would need to be set on that stream |
| Scene change detection | Disable scene change detection | remove -scd 1 |

Evaluate Encoding Efficiency Loss

Certain of the constraints discussed above may introduce encoding efficiency loss. Thus certain examples herein utilize the efficiency loss in making informed encoding decisions.

Certain examples herein work in the domain of compressed video bitstreams, with parsing and re-encoding/rewriting a few bytes, including Video Parameter Set (VPS), Sequence Parameter Set (SPS), Picture Parameter Set (PPS), and Slice Segment Header (SSH), as explained herein, for example, in contrast to a full demuxing/decryption/decoding of video streaming, stitching in pixel domain, and re-encoding/encryption/muxing of stitched video.

Certain examples herein, after bitstream re-writing, generate one single video stream and send the single video stream to one decoder/player instance, e.g., without the requirement of multiple decoders/players. Certain examples herein allow for a personalized rendering of the multiple (e.g., mosaic) video view, e.g., the rendering of the multiple (e.g., mosaic) view is flexible and personalized per customer/device based on the customization with certain (e.g., any) permutations since the bitstream stitching is done on players/devices. Certain examples herein request the video bitstream at the right resolution from the ABR ladder and stitch them together on the given player for the customer/device, e.g., and change the layout at any time by customer selection. Certain examples herein generate an edited and stitched single video stream that is fully conformant against video standards, including, but not limited to HEVC and/or Versatile Video Coding (VVC) standards, and works on numerous (e.g., all) media platforms and hardware. Certain examples herein are backward compatible on devices capable of single view, e.g., devices which are updateable, or not capable of video playback with the edited video stream, can still play one of the original video streams with backward compatibility.

Resolution Constraints in Encoder Ladder Design

Certain examples herein carefully design the (e.g., low) resolutions in an encoder ladder, e.g., in order to ensure that the single video stream stitched from multiple video streams has the right layout, a regular output resolution supported by all eligible media platforms, and/or that individual video streams at (e.g., low) resolutions meet the specific encoder constraints for bitstream editing and stitching.

Video Codec Constraint

In certain examples, the tile concept is available in a video standard specification, such as HEVC, AV1, and VVC, to allow for the implementation of certain stitching discussed herein. Certain examples herein add one or more new (e.g., 1-bit) syntaxes, e.g., on top of tile_info( ) (e.g., in video standard specification). In certain examples, the new syntaxes eliminate encoding efficiency loss, with new encoding and decoding algorithms defined, e.g., including the relaxation of integer multiplication of Coding Tree Units (CTU) in a tile to enable more flexible tile partition in a frame, and at the same time additional encoding and decoding costs and complexities. For example, tile_border_pixel_extension: value of 0 indicates that the pixel values at the picture borders are repeated only outside the frame (so-called constant border extension), but the pixel values at the tile borders inside the frame are not repeated outside the tiles. Value of 1 indicates that the pixel values at all the tile borders are repeated outside the tiles. E.g., where the default value is 0.

tile_border_temporal_prediction_removal: value of 0 indicates that all the motion information outside the tile borders but inside the temporal reference frames is available to be used for the prediction of blocks in the current frame in the decoding process. Value of 1 indicates that all the motion information outside the tile borders in the temporal reference frames is not available to be used for the prediction of blocks in current frame in the decoding process. E.g., where the default value is 0.

Complexity in Parameter Sets Parsing and Re-Encoding/Re-Writing

In certain examples, there are only a few bytes used for parsing and reencoding/re-writing.

Access to Compressed Video Frames and Parameter Sets

In certain examples, the bitstream parsing and re-encoding/re-writing is to access the compressed video frames and parameter sets after demuxing, e.g., creating additional challenges for those players where the content provider does not control the demuxer, such as Media Source Extension (MSE) and/or Encrypted Media Extensions (EME) based players and Apple AVPlayer. However, certain (e.g., Sye brand) players do not have such a constraint.

Access to Slice Segment Headers without Content Encryption

In certain examples, the bitstream parsing and re-encoding/re-writing is to parse and re-encode/re-write slice segment headers, e.g., where those bytes are to be clear. In certain examples, the DRM encryption scheme is to keep a slice header clear, e.g., using a CENC v3 DRM scheme rather than a CENC v1 DRM scheme. In certain examples, a media player (e.g., Sye brand) does not have such a constraint, e.g., it has proprietary content protection and can access the full clear slice segment Network Abstraction Layer (NAL) unit.

DRM Constraints to Ensure Successful Decryption After Stitching

In certain examples, the compressed video frames from different feeds/channels to be edited and stitched together are to have the same DRM information, such as license key and initialization vector. Moreover, where the AES-CTR mode used in PlayReady and Widevine DRM systems has a dependence on byte offsets, revised subsamples after bitstream stitching will result in corrupted offset/location information, compared to the original subsamples before bitstream stitching, so examples herein revise the encryption of compressed frames (e.g., access units), e.g., to encrypt one compressed frame out of every N number of compressed frames in each video stream, and keep the other video streams not encrypted at the same time location of the encrypted compressed frame in this video stream, in order to ensure that incorrect byte offset/location are not inserted after bitstream stitching. Otherwise, decryption on one of the stitched frames would be broken and then results in video corruption artifacts in certain examples. Certain media players (e.g., Sye) do not have DRM and such constraints do not apply.

Sye User Data Protocol (UDP) Video Packet/Frame Dropping

In certain examples, when one of the compressed video streams to be stitched together has video packet/frame dropping, it creates additional complexity and challenges for the editing and stitching in compressed domain. For error concealment not impacting other video streams without packet drop, a fill image (e.g., dummy compressed black I frame) insertion may be used. In certain examples, a fill image is inserted when a stitched compressed bitstream does not generate a regular/common rectangle resolution, e.g., which is a hard requirement in certain video compression standards. However, in certain examples, this would require the renderer to crop and re-composite the small video views properly without the fill image displaying in front of customers. There might be some limitations on certain media platforms and devices where such cropping and re-composition might not be supported. Certain technologies do not have packet/frame dropping.

Buffering and Stalls Coordination Across Multiple Streams:

In certain examples, when one of the video streams to be stitched is stalled, it will impact other video streams, for example, where bitstream stitching has to combine all the video streams at the same time location together into one single stream, e.g., at a higher resolution. In certain examples, heuristics are to be customized and optimized specifically for mosaic view scenario.

Constraint of Uniform Video Stream Properties Across Multiple Streams:

In certain examples, with the input video streams encoded according to the specified constraints, the next step is to merge them into a single, standard-compliant output stream. In certain examples, this process involves modifying specific elements within Network Abstraction Layer (NAL) units to ensure seamless integration of the multiple streams.

In certain examples, the first step in the merging process is to rewrite the Video Parameter Set (VPS). In certain examples, the VPS contains essential information about the video stream, including the indicated level, which defines the decoder's capabilities required to process the stream. In some cases, the VPS may need to be updated to reflect the characteristics of the merged stream, ensuring compatibility with the target decoder.

In certain examples, the Sequence Parameter Set (SPS) is to be rewritten to accommodate the merged video's dimensions. In certain examples, the SPS contains crucial information about the video stream's structure, e.g., the picture size and coding parameters. By updating the picture size in the SPS to match the resulting size from the video mixing process, the merged stream will have the correct resolution and dimensions, enabling proper decoding and display in certain examples.

In certain examples, a Picture Parameter Set (PPS) also plays a significant role in the merging process. In certain examples, the PPS contains information about the coding parameters for one or more pictures, e.g., including the dimensions and arrangement of tiles. To ensure that the merged stream is correctly interpreted by the decoder, in certain examples the PPS is rewritten to set the dimension of tiles based on the size of the input streams and the chosen merging pattern. In certain examples, this information is essential for the decoder to understand the spatial arrangement of the merged tiles within the final video frame.

In certain examples, the slice segment header, e.g., which contains information specific to each slice of the video frame, requires careful modification. In certain examples, two key elements within the slice segment header need to be updated. First, in certain examples, the slice segment address, which indicates the position of the slice within the frame, is be adjusted to reflect the new position of the slice in the merged video. This ensures that the slices are correctly positioned within the merged frame, maintaining the intended spatial arrangement. Second, in certain examples, the quantization parameter (QP) for each slice is to be consistent across the merged stream. In certain examples where the initial QP values (e.g., init_qp_minus26) in the PPS of the different input streams differ, the slice_qp_delta syntax element in the slice segment header is to be updated, for example, where this adjustment maintains the same resulting QP as the original stream, e.g., guaranteeing that the quantization parameters remain consistent throughout the merged video.

In certain examples, by carefully applying these modifications to the VPS, SPS, PPS, and slice segment headers, multiple HEVC video streams that adhere to the specified encoder constraints can be seamlessly combined into a single, standard-compliant output stream. The resulting merged stream can be efficiently decoded by a (e.g., HEVC) decoder without requiring any further modifications or customizations.

In certain examples, the merging process enables the creation of a unified video stream that combines the content from multiple sources, opening up new possibilities for applications such as multi-view video streaming, picture-in-picture displays, and video conferencing. By leveraging the flexibility and efficiency of a video standard (e.g., an HEVC standard), along with the specified encoder constraints and merging techniques, content providers can deliver rich, immersive video experiences to their audiences while optimizing bandwidth usage and ensuring compatibility with existing playback devices.

In certain examples, all the video streams to be stitched are to have the same encoding properties, e.g., the same frame rate. In certain examples, bitstream stitching will not be able to handle some video streams at a high frame rate but will handle others at a lower (e.g., standard) frame rate. Certain examples herein mitigate the constraint of consistent frame rate across different video streams by enabling temporal scalability. For example, extracting and enabling a video stream at standard frame rate (SFR) (e.g., 30 frames per second (fps)) from the original high frame rate (HFR) video stream (e.g., at 60 fps) and high resolution (e.g., 720p and above), and stitch it to those originally at SFR (e.g., 30 fps) and low resolutions. Or in other examples, the video streams are encoded at low resolution and low bit rate as a pseudo HFR that every other frame is actually a duplicate of the previous frame with minor encoding efficiency loss, and then video streams at low bit rates and low resolution are stitched with those at HFR and high resolutions.

Although certain examples herein discuss stitching live videos together, it should be understood that linear channels, sports shorts, and video-on-demand may also include stitched together videos according to this disclosure.

Flexible Layouts

As one set of examples, there are five candidate resolutions for a primary view (e.g., the larger of the viewing area for a combined video) and two candidate resolutions for a secondary view (e.g., the smaller than a primary view), with the examples below for Table 2.

TABLE 2

Candidate Resolutions

| Frame resolution | Need Padding? | Encoded resolution | Used in primary or secondary |
|---|---|---|---|
| 1280 × 720 | Y | 1280 × 736 | primary |
| 1152 × 648 | Y | 1152 × 672 | primary |
| 1024 × 576 | N | 1024 × 576 | primary |
| 960 × 540 | Y | 960 × 544 | primary |
| 704 × 396 | Y | 704 × 416 | primary |
| 512 × 288 | N | 512 × 288 | secondary |
| 256 × 144 | Y | 256 × 160 | secondary |

FIG. 4 is a diagram illustrating a template of a combined video 160 having a slice 402-1 for a primary video, and a first slice 404-1, second slice 404-2, and third slice 404-3 for other videos according to some examples. Template of combined video 160 includes a first tile ("tile 0") 400 (e.g., column) with a single slice 408, a second tile ("tile 1") 402 (e.g., column) with slice 1 402-1 (e.g., area) for a stream, and slice 2 402-2 (e.g., area) for a stream, e.g., where each slice has a same resolution (e.g., thus defining a vertical straight line on each side of the slice). Template of combined video 160 includes a third tile ("tile 2") 404 (e.g., column) with slice 1 404-1 (e.g., area) for a stream, slice 2 404-2 (e.g., area) for a stream, and slice 3 404-3 (e.g., area) for a stream, e.g., where each slice has a same resolution (e.g., lower resolution that the slice in tile 1 402). Template of combined video 160 includes a fourth tile ("tile 3") 406 (e.g., column) with slice 1 406-1 (e.g., area) for a stream, slice 2 406-2 (e.g., area) for a stream, and slice 3 406-3 (e.g., area) for a stream, e.g., where each slice has a same resolution (e.g., lower resolution that the slice in tile 1 402). In certain examples, fill (e.g., shown as black fill) is included where a slice or other area of the template of combined video 160 is not to be used to show content, for example, black fill 408 in an (e.g., unused for content) slice on the leftmost edge, black fill 402-2 in an (e.g., unused for content) slice 2 of tile 1 402, and black fill 406-4 in an (e.g., unused for content) portion (e.g., slice) of tile 3 406, e.g., to form a rectangular format of the video and its frames.

In certain examples, the proposed view layout design enables flexible ABR resolution modifications across all views. In certain examples, a maximum of three secondary view resolutions can coexist simultaneously, e.g., due to bitstream stitching algorithm requirements. In certain examples, each resolution must occupy a tile (e.g., distinct column) in the layout to avoid conflicts. In certain examples, a template layout consists of 1 primary view position and 6 secondary view candidate positions as shown in FIG. 4. In certain examples, additional (e.g., "dummy") black fill 408 of variable width is attached on the left to maintain a constant decoded picture width (e.g., 1920 pixels). In certain examples, the height is fixed (e.g., at 864 pixels), for example, being 3 times the 288p image height, resulting in a 1920×864 resolution. In certain examples, candidates 1-3 are 512×288 resolution while candidates 4-6 are 256×144 resolution, encoded at 256×160. In certain examples, for a 1 primary+3 secondary view configuration, any 3 of the 6 candidates can be selected, with flexible ABR switching of the 3 over time. In certain examples, a bitstream stitching algorithm places the 3 chosen streams in their designated spots, filling the remaining 3 positions with fill (e.g., black) frames along with 2 additional fill (e.g., black) frames to complete the 1920×864 rectangle.

In certain examples, e.g., according to HEVC spec A.3.2, A.3.3, HEVC main, main 10, Main Still Picture profiles require the following:

When an active PPS for the base layer has tiles_enabled_flag equal to 1, ColumnWidthInLumaSamples [i] shall be greater than or equal to 256 for all values of i in the range of 0 to num_tile_columns_minus1, inclusive, and RowHeightInLumaSamples[j] shall be greater than or equal to 64 for all values of j in the range of 0 to num_tile_rows_minus1, inclusive.

Thus in certain examples, the left side fill (e.g., black) 408 bar is not allowed if the required bar is less than 256 pixel width. One workaround is to pad on the left side at encoding.

Error Handling in Multiview Streaming

Certain examples of live video streaming (e.g., when employing ultra-low latency protocols such as, but not limited to, UDP) faces significant challenges related to packet loss and other disruptions, e.g., including encoder failures. These issues, while manageable in single-stream scenarios, become more complex and potentially impactful when dealing with multiview streaming environments that rely on bitstream stitching techniques. In certain single-stream streaming, occasional buffering or loss of a stream can often be mitigated through techniques such as pausing playback or replaying the buffer. However, these methods are less effective and sometimes inadequate in multiview streaming. When one video stream in a multiview setup buffers or fails, it can disrupt the carefully arranged stitched streams, leading to irregular and non-rectangular layouts that are difficult to stitch properly. As a result, the failure of a single stream can cause the entire multiview presentation to collapse, e.g., affecting all the displayed views and significantly degrading the user experience.

To address these vulnerabilities, certain examples herein strategically insert specially prepared frames to maintain the integrity of the multiview output, e.g., even in the presence of individual video stream loss. In certain examples, these special frames are pre-encoded and sized to match the dimensions of the potentially lost streams, e.g., acting as a safeguard against the disruptive effects of stream failure. By seamlessly inserting these frames in place of the lost views, certain examples herein maintain the visual continuity and structural integrity of the multiview presentation.

Certain examples herein utilize a "skip mode" in HEVC, e.g., as a powerful compression technique that infers motion data instead of explicitly signaling it and assumes a zero prediction residual, meaning no transform coefficients are transmitted. By constructing these special frames as P-slices, where all blocks are set to 'skip' mode with zero motion vectors, certain examples herein effectively create a frame that copies the reference frame, resulting in a freezing effect. In certain examples, when a stream in the Multiview setup is lost, it is replaced with this all-skip P-slice, which maintains the visual continuity of the affected view without disturbing the rest of the views. This approach ensures that the overall structure and flow of the Multiview experience remain unaffected, even in the presence of individual stream failures.

To effectively implement the "skip mode" solution for maintaining visual continuity in the event of a stream loss, careful configuration of the reference picture set (RPS) (e.g., reference picture list) is crucial. In certain (e.g., HEVC) coding standards, the reference picture list is signaled in the slice segment header using syntax elements (e.g., num_ref_idx_10_active_minus1, num_ref_idx_11_active_minus1, ref_pic_list_modification_flag_10, ref_pic_list_modification_flag_11, list_entry_10[ ], and list_entry_11[ ]). By modifying these elements in the slice header of the inserted P-slice, certain examples herein effectively control which reference picture is used for the "skip mode" blocks. Certain examples herein set the num_ref_idx_10_active_minus1 to 0, e.g., indicating that only one reference picture is used in the list; the ref_pic_list_modification_flag_10 is set to 1, e.g., signaling that the reference picture list is modified; and the list_entry_10[0] is then set to the index of the desired reference picture in the reference picture set (RPS). By carefully constructing the RPS and setting the list_entry_10[0] to the appropriate index, certain examples herein ensure that the inserted P-slice copies the intended reference picture, e.g., effectively freezing the affected view without disturbance to the other views in the multiview setup.

Certain examples herein optimize the error concealment scenario of video frame/packet loss (e.g., in UDP based video streaming) when bitstream stitching is enabled. Certain examples herein insert a fill (e.g., dummy) compressed (e.g., black) I frames for the impacted stream that had a packet drop, not impacting other video streams without packet drop. Certain examples herein use a fill frame for flexible and robust tile layout, e.g., when a stitched compressed bitstream does not generate a regular/common rectangle resolution, for the best device compatibility. For example, if it is desired to stitch three 512×288 video streams, it may be preferable to insert a dummy stream with (e.g., all) fill (e.g., black) I frames and formalize a single stream of 1024×576 with the black region cropped during rendering (e.g., by graphics processor 164), rather than a stitched resolution of 1536×288 or 512×864. Similarly, if it is desired to stitch three 1024×576 video streams, it may be preferred to insert a fill (e.g., dummy) stream with (e.g., black) I frames and formalize a single stream of 2048×1152 with the fill (e.g., black) region cropped during rendering, rather than a stitched resolution of 3072×576 or 1024×1728. Enabling Adaptive Bitrate Resolution Changes in HEVC Encoded Streams Certain examples herein enabling Adaptive Bitrate (ABR) resolution changes in (e.g., HEVC) encoded streams utilizing bitstream stitching. In certain examples, the primary challenges in adjusting resolutions in a multiview setup include vertical stitching compatibility and non-rectangular layouts. In certain examples, vertical stitching issues arise when a video's height does not correspond to an integer multiple of the CTU and/or CTB size, leading to incomplete CTUs/CTBs at the end of a video that can cause decoding errors and disrupt stream continuity. In certain examples, non-rectangular layouts pose a significant challenge since certain standards (e.g., HEVC) require rectangular frames for encoding and decoding, e.g., complicating the processing and integration of video frames.

Solutions to Non-Rectangular Layout Issues

To manage and rectify non-rectangular layouts, certain examples herein insert fill (e.g., black) slices (e.g., black intra slices) and/or utilize (e.g., HEVC) tiles and slices. In certain examples, pre-encoded black intra slices, or Null Units, are inserted to fill gaps resulting from non-rectangular alignments, converting an irregular frame into a rectifiable rectangular shape suitable for (e.g., HEVC) processing. In certain examples, the Null Unit is prepared in advance with a specific header configuration to seamlessly integrate into the existing video stream during stitching. In certain examples, the NAL Unit Type in the NAL header is adjusted to align with the types of the surrounding slices, and/or the PicOrderCntLsb flag within the Slice Header is altered to ensure that all slices within the segment share the same Picture Order Count (POC). In certain examples, the syntax of the st_ref_pic_set( ) section within the slice header is modified to mirror that of the other slices, e.g., meeting a (e.g., HEVC) video standard's conformance requirements. In certain examples, although the Black Intra Slice lacks reference pictures, its Reference List is modified to align with a (e.g., HEVC) video standard, e.g., primarily to ensure conformity rather than altering the functional properties of the slice. In certain examples, (e.g., HEVC) tiles and slices are leveraged to manage resolution variations by grouping videos by their horizontal resolutions and aligning each group into a tile. In certain examples, within these tiles, individual video segments, or views, are processed as separate slices. In certain examples, where there are discrepancies in the vertical dimensions of these columns, pre-encoded black intra blocks are inserted to equalize the column heights, e.g., ensuring a uniform and continuous rectangular grid across the entire frame. In certain examples, this setup facilitates seamless stitching of diverse video resolutions and maintains flexibility to adjust tile and slice configurations as resolutions change dynamically.

In certain examples, the implementation of these strategies enhances the adaptability and robustness of the video streaming system, ensuring that resolution changes are seamlessly integrated without compromising the quality or continuity of the multiview streaming experience.

Figure 5:
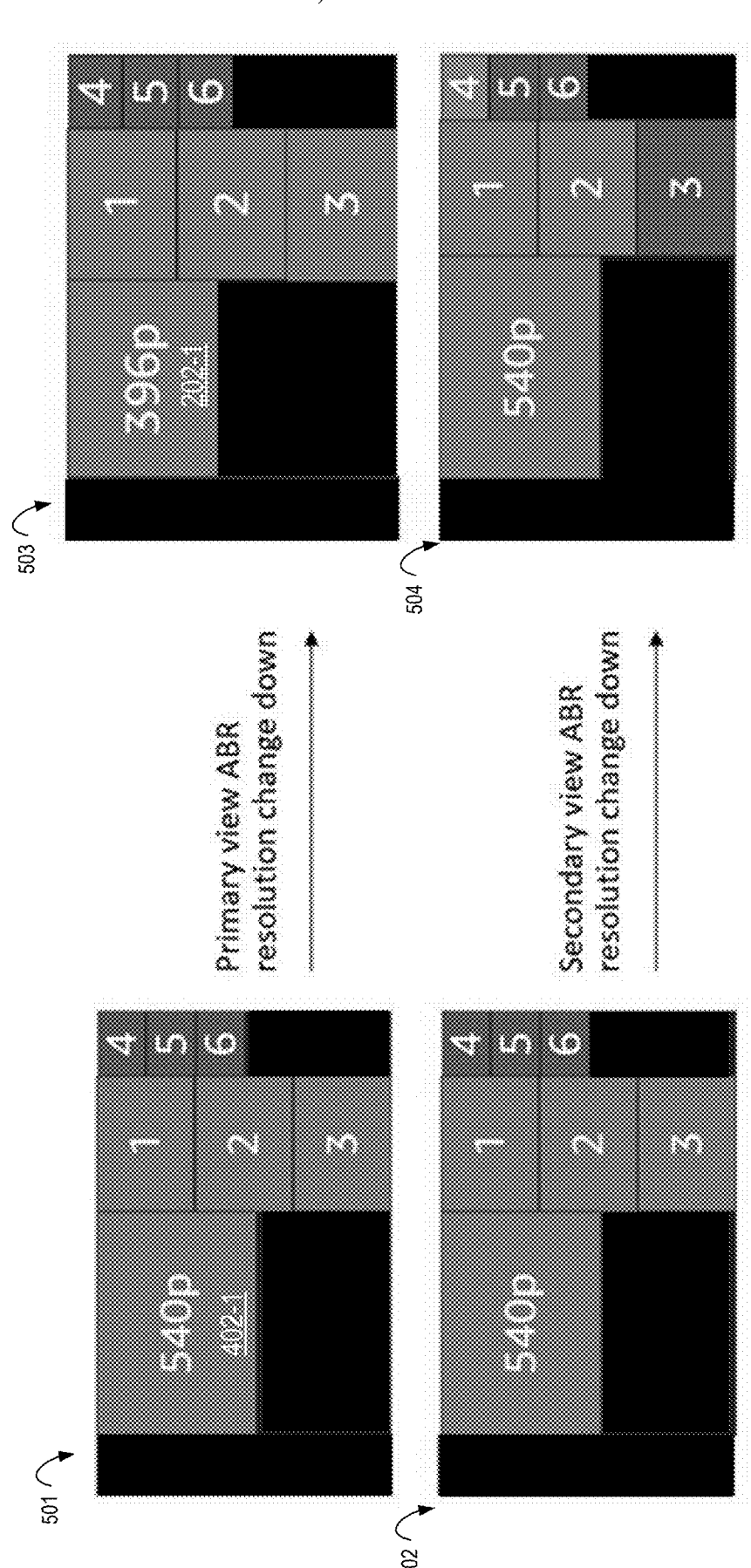
FIG. 5 is a diagram illustrating a change in the template of the combined video in FIG. 4 when there is an adaptive bit rate (ABR) resolution change down for the primary video, and the template of the combined video in FIG. 4 when there is an adaptive bit rate (ABR) resolution change down for the secondary video in the third slice and the lower resolution version of the secondary video is moved to the fourth slice according to some examples.

FIG. 5 is a diagram illustrating a change in the template of the combined video 160 in FIG. 4 from 501 to 503 when there is an adaptive bit rate (ABR) resolution change down for the primary video, and the template of the combined video in FIG. 4 from 502 to 504 when there is an adaptive bit rate (ABR) resolution change down for the secondary video in the third slice and the lower resolution version of the secondary video is moved to the fourth slice according to some examples.

As one set of examples, the top row depicts the initial state comprising one 540p primary view and three 288p secondary views active. The primary view occupies 540p resolution while secondary view positions 1, 2, and 3 are utilized. Secondary view locations 4, 5, and 6 remain unused and are populated with black frames presently. If the primary view experiences a downshift to a lower resolution at a given point, it will transition to the lower resolution, with the same secondary view positions 1, 2, and 3 persisting. In the bottom row, if one secondary view requires a switch to a lower resolution, the active secondary views transition from locations 1, 2, and 3 to 1, 2, and 4, with positions 3, 5, and 6 being replaced by a fill (e.g., black) frame. Table 3 below includes examples stitched resolutions.

TABLE 3

| Stitched Resolution and Fill (e.g., Black) Areas | | |
| --- | --- | --- |
| Primary resolution | Stitched resolution | Fill (e.g., Black) Areas |
| 1280 × 720 | 2688 × 864 | 1280 × 128 256 × 384 512 × 288 256 × 160 |
| 1152 × 648 | 1920 × 864 | 1152 × 192 256 × 384 512 × 288 256 × 160 |
| 1024 × 576 | 1792 × 864 | 1024 × 288 256 × 384 128 × 864 512 × 288 256 × 160 |
| 960 × 540 | 1728 × 864 | 960 × 320 256 × 432 192 × 864 512 × 288 256 × 160 |
| 704 × 396 | 1472 × 864 | 704 × 448 256 × 384 448 × 864 512 × 288 256 × 160 |

In certain examples, only three secondary views (e.g., instead of four or more secondar views) are utilized because the decoded picture height is constrained to 1080 to accommodate up to three secondary views at 288p resolution. In certain examples, if more secondary views are needed, the maximum resolution can be reduced (e.g., to 256×455) (e.g., with slight content aspect ratio change) to allow for 4 secondary views.

Figure 7:
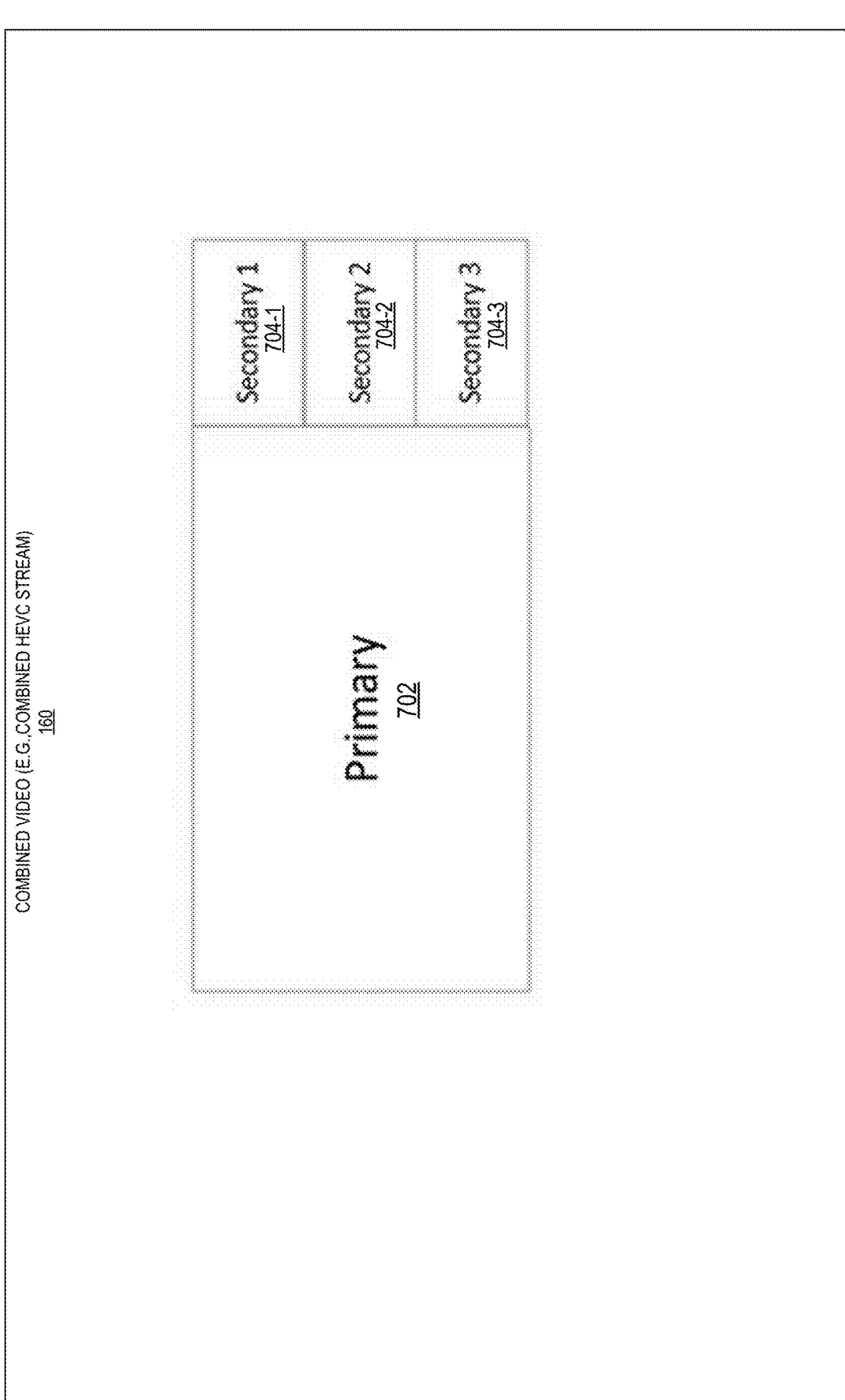
FIG. 7 is a diagram illustrating a template of a combined video having a slice for each of a primary video with a resolution that is three times the resolution of each of a first "secondary" video, second "secondary" video, and third "secondary" video for other videos according to some examples.

In certain examples (e.g., that do not utilize a graphics processor), when the ABR resolution changes, all the merged views are to change resolutions at the same time and maintain the same relative size, for example, if the area ratio of each secondary section to the primary section was originally 1:3 (e.g., as shown in FIG. 7), then after the ABR resolution change the area ratio is still 1:3.

Although the above discusses different sized views, it should be understood that (e.g., only) equal sized views may be included. In certain examples, the desired resolutions of the constituent streams are padded to achieve a desired aspect ratio (e.g., 16 units of width to 9 units of height, i.e., 16:9), e.g., to make the single stitched video the desired aspect ratio without using a graphics processor.

Rounding for Horizontal Dimension

In certain examples, a key aspect of resolution selection for stitched video is that the video width of each video is a multiple of a coded tree unit (CTU) and/or coded tree block (CTB) size (e.g., 32 bits wide) and thus the width of video is not always going to be integer when maintaining an exact aspect ratio. As a result, the width is not always an integer. The table 4 below shows example resolutions and what the width is rounded to. In certain examples (e.g., within 1-3 pixel difference), viewers should not notice aspect ratio changes. The next step is to visually check these videos and evaluate the effect of this rounding.

Padding for Vertical Merging

In certain examples, to address vertical stitching issues in a live streaming scenario, specific measures are implemented regarding the resolution configurations of the encoded streams. In certain examples, the horizontal resolution of all compressed streams is to be an integer multiple of the configured CTU and/or CTB size to ensure consistent horizontal alignment. However, this does not guarantee that the vertical resolution will align as an integer multiple of the CTB size. To rectify potential discrepancies, certain examples herein utilize a padding strategy during compression, e.g., padding the vertical dimension to the nearest integer multiple of the CTB size. This padding maintains the structural integrity of the video frame during encoding and facilitates seamless vertical stitching of multiple streams. In certain examples, the conformance window setting in the Sequence Parameter Set (SPS) is manipulated to ensure that these adjustments do not affect the standalone playback quality of individual streams. In certain examples, when integrated into a multiview setup, the padding ensures that each decoded picture maintains dimensions that are integer multiples of the CTU and/or CTB size (i) horizontally, (ii) vertically, or (iii) both horizontally and vertically, e.g., eliminating issues related to stitching and ensuring perfect alignment without gaps or mismatches. In certain examples, (i) a (e.g., each) frame of a combined video has its (horizontal) width selected as an integer multiple of the CTU (or CTB) size, and that frame is then padded vertically (e.g., along an edge) to maintain a desired two-dimensional frame size of the padded video, (ii) a (e.g., each) frame of a combined video has its (vertical) height selected as an integer multiple of the CTU (or CTB) size, and that frame is then padded horizontally (e.g., along an edge) to maintain a desired two-dimensional frame size of the padded video, or (iii) a (e.g., each) frame of a combined video has neither its (horizontal) width as an integer multiple of the CTU (or CTB) size nor its (vertical) height as an integer multiple of the CTU (or CTB) size, and that frame is then padded vertically and padded horizontally to maintain a desired two-dimensional frame size of the padded video.

In certain examples, after prioritizing vertical resolution to be a multiple of the CTU size (e.g., 32), the horizontal resolution W will not be a multiple of 32 anymore. This can be fixed by adding vertical padding (e.g., fill) to the left of the primary view and right of the secondary view. In certain examples, the merged video will signal conformance cropping in the SPS and the decoder will crop the padded area from the decoded picture. In certain examples, the output frame will be free of padding. In certain examples, conformance cropping is part of an encoding (e.g., HEVC) standard, thus it is implemented by a decoder. In certain examples, the input to a hardware compositor will already be cropped. In certain examples, the hardware compositor only needs to upscale the frame to full screen without custom cropping, repositioning, and up/down scaling from a graphics processor. Note that in certain examples, this method uses both left and right padding, which is rarely seen. Certain encoders support padding on both the left and right sides. Certain decoders support cropping on both the left and right sides.

Figure 6:
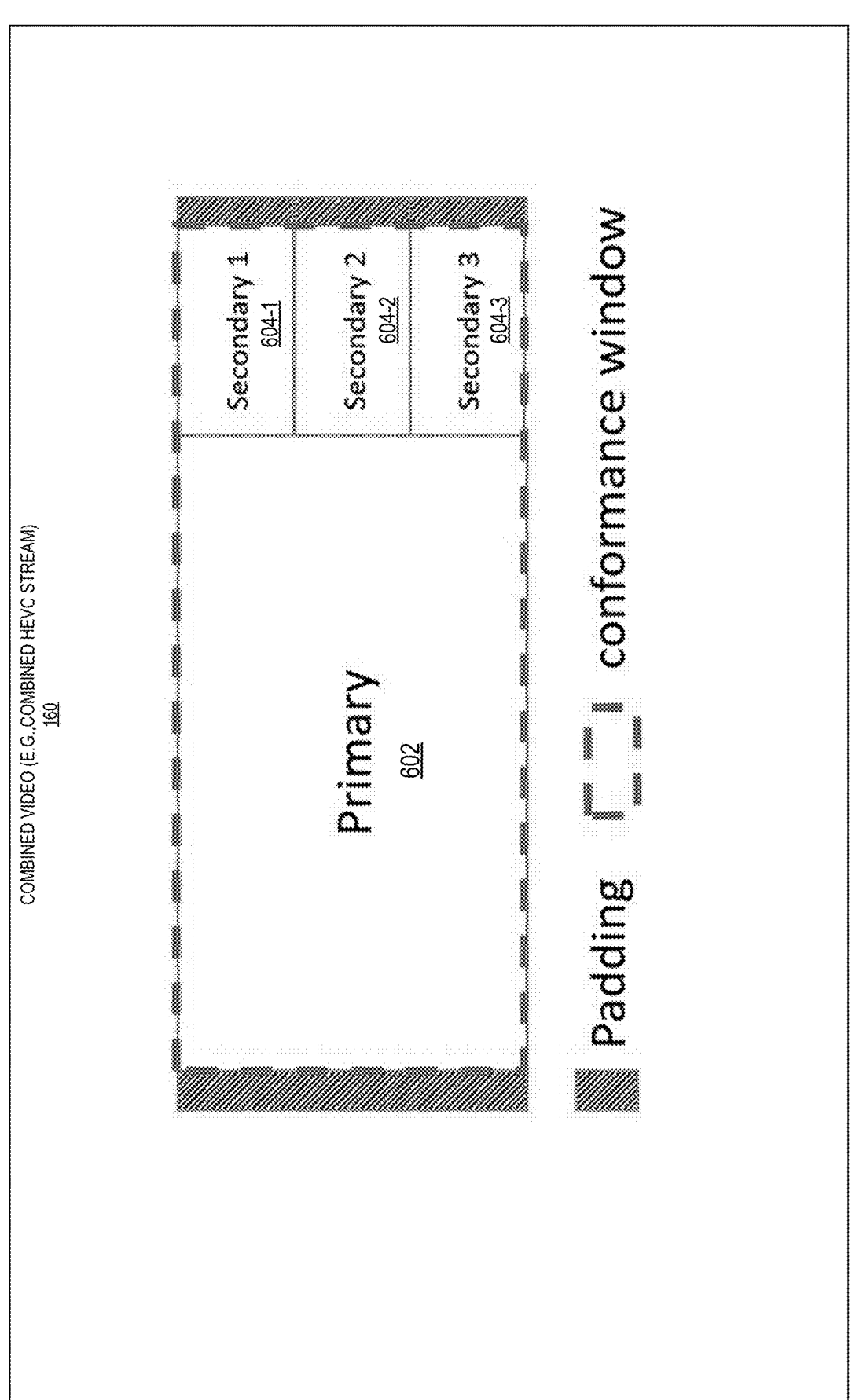
FIG. 6 is a diagram illustrating a template of a combined video having a slice for a primary video, and first, second, and third slices for other videos, padding applied to the slices, and a conformance window according to some examples.

FIG. 6 is a diagram illustrating a template of a combined video 160 having a slice for a primary video 602, and first slice 604-1, second slice 604-2, and third slice 604-3 for other videos, padding (shown with hashed lines) applied to the slices, and a conformance window (shown as a dotted box) according to some examples. In certain examples, the conformance window is achieved by a decoder, e.g., a decoder that supports cropping on both the left and right sides of the video.

Certain examples herein utilize a fixed ratio of a primary view to secondar views.

Resolution Set 1: Primary View is Three Times the Secondary View

FIG. 7 is a diagram illustrating a template of a combined video 160 having a slice for each of a primary video 702 with a resolution that is three times the resolution of each of a first "secondary" video 704-1, second "secondary" video 704-2, and third "secondary" video 704-3 for other videos according to some examples.

TABLE 3

Example Dimensions When Primary View Is Three Times Larger than the
Secondary View (e.g., in pixels)

| Primary H | W | W(round to) | W(padded to) | Aspect ratio | Secondary (3 in one column) H | W | W(round to) | W(padded to) | Aspect ratio | Merged H | W | W(padded to) |
|---|---|---|---|---|---|---|---|---|---|---|---|---|
| 192 | 341.3333 | 342 | 352 | 1.78125 | 64 | 113.7778 | 114 | 128 | 1.78125 | 192 | 456 | 480 |
| 288 | 512 | 514 | 544 | 1.78472 | 96 | 170.6667 | 172 | 192 | 1.79167 | 288 | 686 | 736 |
| 384 | 682.6667 | 684 | 704 | 1.78125 | 128 | 227.5556 | 228 | 256 | 1.78125 | 384 | 912 | 960 |
| 480 | 853.3333 | 856 | 864 | 1.78333 | 160 | 284.4444 | 286 | 288 | 1.7875 | 480 | 1142 | 1152 |
| 576 | 1024 | 1026 | 1056 | 1.78125 | 192 | 341.3333 | 342 | 352 | 1.78125 | 576 | 1368 | 1408 |
| 672 | 1194.667 | 1196 | 1216 | 1.77976 | 224 | 398.2222 | 400 | 416 | 1.78571 | 672 | 1596 | 1632 |

In certain examples, a stitched video template is selected from (e.g., only) the above sets of dimensions (e.g., select a row from the plurality of rows of Table 3).

In certain examples, the column for height (H) is first fixed to maintain a multiple of CTU and/or CTB size. In certain examples, the width (W) is calculated to maintain a desired (e.g., 16:9) content aspect ratio and W (round) is up to a threshold (e.g., 3) pixels round up and/or down so all resolutions have an aspect ratio of 57:32=1.78125≈16:9. In certain examples, W (padded) is rounded as W (round) to the closest multiple of CTU and/or CTB size, and is what the video is padded to. In certain examples, the resolution with padding is the resolution encoded/decoded, and the resolution without padding is the resolution valid for output and rendering (e.g., with or without scaling) for display.

Resolution Set 2: Primary View is Four Times the Secondary View

Figure 8:
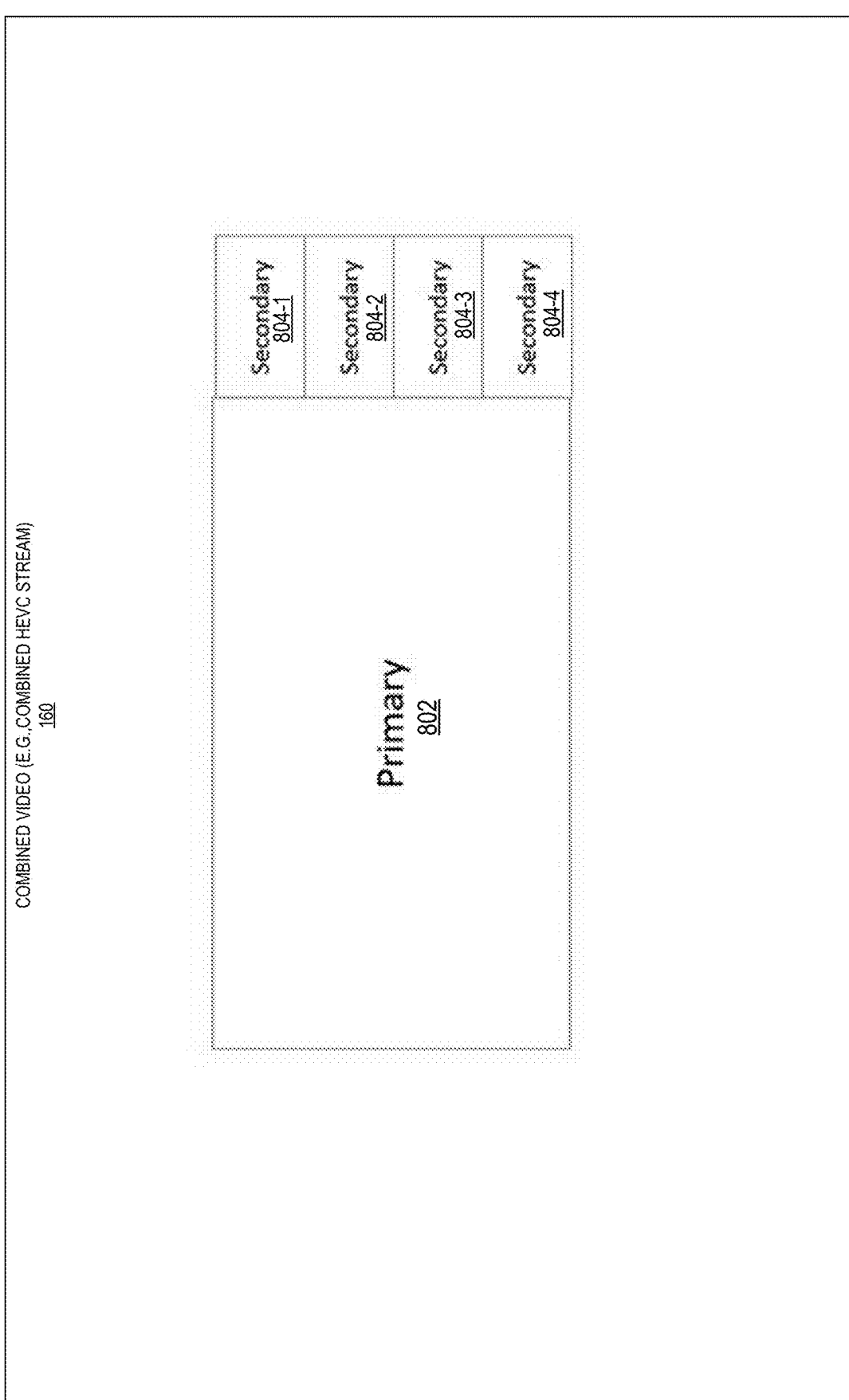
FIG. 8 is a diagram illustrating a template of a combined video having a slice for each of a primary video with a resolution that is four times the resolution of each of a first "secondary" video, second "secondary" video, third "secondary" video, and fourth "secondary" video for other videos according to some examples.

FIG. 8 is a diagram illustrating a template of a combined video having a slice for each of a primary video 802 with a resolution that is four times the resolution of each of first "secondary" video 804-1, second "secondary" video 804-2, third "secondary" video 804-3, and fourth "secondary" video 804-4 for other videos according to some examples.

padding is the resolution encoded/decoded, and the resolution without padding is the resolution valid for output and rendering (e.g., with or without scaling) for display.

Video Ladder and Heuristics for Multiple (e.g., Mosaic) View

When a customer is in a multiple (e.g., mosaic) view (e.g., multiple view mode) with equal window size for each view, certain examples herein enable adaptive bit rate switches across a limited set of bit rates and resolutions, rather than the original full bit rate ladder, e.g. where 720p and 1080p resolutions are not necessary for that (e.g., small) mosaic view. Certain examples herein define additional resolutions in the ladder just for multiple (e.g., mosaic) view (e.g., mode) purposes, e.g., 256×144, not used when customers watch the video stream in the single view (e.g., single view mode). In certain examples, when there is a primary view and secondary mosaic video views in a multiple view mode, the video stream for the primary view could have a higher resolution and bit rate, compared to those for secondary views. In certain examples, heuristics are customized and optimized according to the layout of multiple view and window sizes, together with the optimizations in bit rate ladder design.

TABLE 4

Example Dimensions When Primary View Is Four Times Larger than the
Secondary View (e.g., in pixels)

| Primary H | W | W(round to) | W(padded to) | Aspect ratio | Secondary (3 in one column) H | W | W(round to) | W(padded to) | Aspect ratio | Merged H | W | W(padded to) |
|---|---|---|---|---|---|---|---|---|---|---|---|---|
| 256 | 455.1111 | 456 | 480 | 1.78125 | 64 | 113.7778 | 114 | 128 | 1.78125 | 256 | 570 | 608 |
| 384 | 682.6667 | 684 | 704 | 1.78125 | 96 | 170.6667 | 171 | 192 | 1.78125 | 384 | 855 | 896 |
| 512 | 910.2222 | 912 | 928 | 1.78125 | 128 | 227.5556 | 228 | 256 | 1.78125 | 512 | 1140 | 1184 |
| 640 | 1137.778 | 1140 | 1152 | 1.78125 | 160 | 284.4444 | 285 | 288 | 1.78125 | 640 | 1425 | 1440 |
| 768 | 1365.333 | 1368 | 1376 | 1.78125 | 192 | 341.3333 | 342 | 352 | 1.78125 | 768 | 1710 | 1728 |

In certain examples, a stitched video template is selected from (e.g., only) the above sets of dimensions (e.g., select a row from the plurality of rows of Table 4).

In certain examples, the column for height (H) is first fixed to maintain a multiple of CTU and/or CTB size. In certain examples, the width (W) is calculated to maintain a desired (e.g., 16:9) content aspect ratio and W (round) is up to a threshold (e.g., 3) pixels round up and/or down so all resolutions have an aspect ratio of 57:32=1.78125≈16:9. In certain examples, W (padded) is rounded as W (round) to the closest multiple of CTU and/or CTB size, and is what the video is padded to. In certain examples, the resolution with Key Parameters to Modify for Multiple (e.g., Mosaic) View One method to merge a plurality of encoded files is to modify their respective video headers, and pack them into a single bitstream. The below discusses example parameters (e.g., flags) that are to be modified to enable multiple view (e.g., mosaic view).

FIG. 9 is an example of slice header semantics 900 for including multiple videos for simultaneous viewing according to some examples. In certain examples, the parameters to modify for multiple view include first slice segment in picture flag (first_slice_segment_in_pic_flag) 902 located in slice header (e.g., where a descriptor of u(1) means that has a width of a single bit). Particularly, as there are now two or more sets of video streams being input for an output of a single video, certain examples herein are to remove (e.g., clear) one of the first slice segment in picture flags 902 (first_slice_segment_in_pic_flag) so the decoder, etc. does not cause an error by having multiple "first" slices in a single picture (e.g., single frame). In certain examples, the parameters to modify for multiple view include a slice address (slice_address or slice_segment_address 904) located in slice header (e.g., where a descriptor of u(v) means it can have a variable bit width of "v"). Particularly, as there are now two or more sets of video streams being input for an output of a single video, certain examples herein are to modify one or more slice segment addresses, e.g., using FIG. 4 as an example, where slice segment address for slice 1 for primary view 402-1 is in the upper left of the video 160, but slice segment address for slice 1 for secondary view 404-1 is (e.g., modified to be) in the upper middle part of the video 160.

FIG. 10 is an example of sequence parameter set (SPS) semantics 1000 for including multiple videos for simultaneous viewing according to some examples. In certain examples, the parameters to modify for multiple view include a picture (e.g., frame) width and/or height. In certain examples, the parameters to modify for multiple view include a picture width in luma samples 1002 (pic_width_in_luma_samples) (e.g., in units of luma samples) located in SPS and/or a picture height in luma samples 1004 (pic_height_in_luma_samples) located in SPS. Particularly, as there are now two or more sets of video streams being input for an output of a single video, certain examples herein are to modify the picture width and/or picture height to represent the entire picture (e.g., frame), and not just the portion of the frame displaying a particular video of multiple videos, e.g., using FIG. 4 as an example, where the picture width and/or picture height for slice 1 402-1 (or any other slice) is that of the entire width (e.g., 1920 pixels or luma samples) and/or entire height (e.g., 864 pixels or luma samples) of the combined video 160.

FIG. 11 is an example of picture parameter set (PPS) semantics 1100 for including multiple videos for simultaneous viewing according to some examples. In certain examples, the parameters to modify for multiple view include a number of tile columns minus one 1102 (num_tile_columns_minus1) located in PPS and/or number of tile rows minus one 1104 (num_tile_rows_minus1) located in PPS. Particularly, as there are now two or more sets of video streams being input for an output of a single video, certain examples herein are to modify the number of columns in each tile (minus 1) and/or the number of rows in each tile (minus 1) to represent the entire picture (e.g., frame), and not just the portion of the frame displaying a particular video of multiple videos. In certain examples, the parameters to modify for multiple view include a column width minus one 1106 (column_width_minus1) located in PPS and/or a row height minus one 1108 (row_height_minus1) located in PPS. Particularly, as there are now two or more sets of video streams being input for an output of a single video, certain examples herein are to modify the width of each column and/or the height of each row to represent the entire picture (e.g., frame), and not just the portion of the frame displaying a particular video of multiple videos.

In certain examples, the parameters to modify for multiple view include a uniform spacing flag 1110 (uniform_spacing_flag) located in PPS. Particularly, as there are now two or more sets of video streams being input for an output of a single video, certain examples herein are to modify the uniform spacing flag to (e.g., zero) specify that the column and row boundaries across a tile (e.g., the stitched frame) are not distributed evenly (e.g., when the stitched videos have different sizes), but are instead indicated by the syntax elements of column width minus one 1106 (column_width_minus1) and row height minus one 1108 (row_height_minus1).

In certain examples, the parameters to modify for multiple view include a loop filter across tiles enabled flag 1112 (loop_filter_across_tiles_enabled_flag). Particularly, as there are now two or more sets of video streams being input for an output of a single video, certain examples herein are to modify the loop filter across tiles enabled flag to disable (e.g., set it to zero).

In certain examples, the picture parameter set (PPS) includes an option to divide a slice into multiple slice segments. These segments share information from the first segment's header, which is known as an independent slice segment. This independent segment can be decoded on its own, separate from other slices or segments in the same picture. Subsequent segments are called dependent slice segments and have a simplified header indicating the active PPS and the address of the first CTB in the segment.

FIG. 13 is an example of a coding tree unit (CTU) 1300 according to some examples. In certain examples, an image (e.g., pixels thereof) include corresponding luminance (component) blocks (e.g., "Y") and chroma (component) (e.g., U component=B'−Y' (blue–luma; blue difference) and V component=R'−Y' (red–luma; red-difference)).

In certain examples, CTU 1300 includes a coding tree block (CTB) of luma samples 1302, two corresponding coding tree blocks of chroma samples (blue-difference $C_B$ chroma CTB 1304 and red-difference $C_R$ chroma CTB 1306) of a picture, e.g., along with syntax elements 1308 (e.g., as discussed herein). The division of a slice into coding tree units is a partitioning. In certain examples, a coding tree block (CTB) is an N×N block of samples for an integer value of N. In certain examples, blue-difference $C_B$ chroma CTB 1304 and red-difference $C_R$ chroma CTB 1306 are the same size. In certain examples, blue-difference $C_B$ chroma CTB 1304 and/or red-difference $C_R$ chroma CTB 1306 are a different (e.g., smaller) size than the luma CTB 1302.

Figure 14:
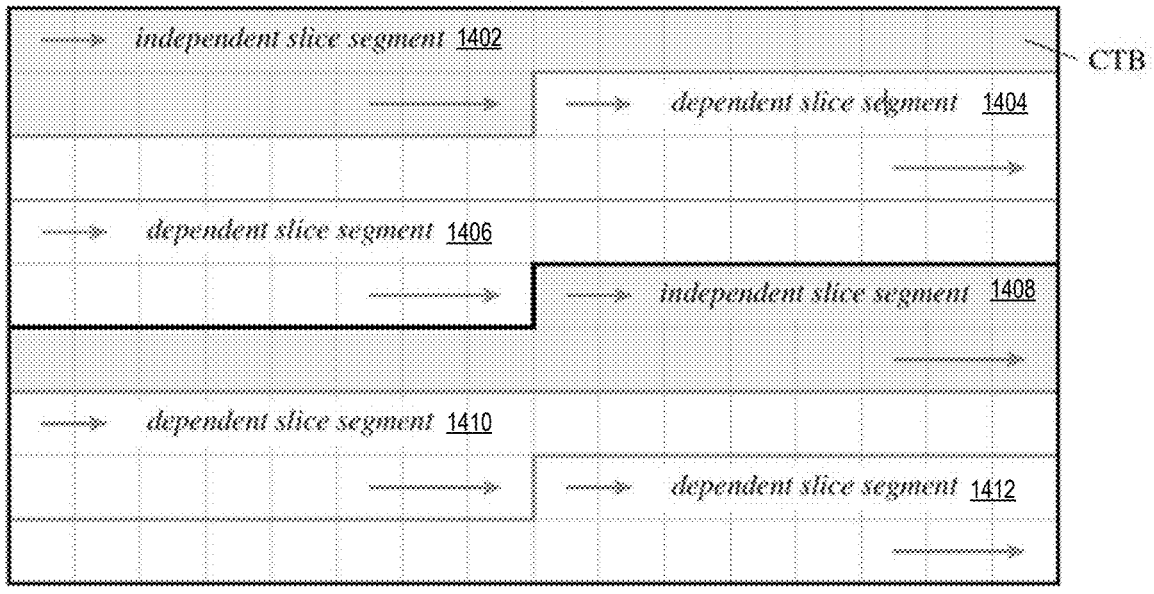
FIG. 14 is an example of a picture (e.g., frame) with a plurality of coding tree blocks according to some examples.

FIG. 14 is an example of a picture (e.g., frame) 1400 with a plurality of (e.g., 144) coding tree blocks according to some examples. In certain examples, the picture 1400 is divided into slices, shown as independent slice segment 1402 and its dependent slice segments 1404 and 1406, and independent slice segment 1408 and its dependent slice segments 1410 and 1412.

In certain examples, the (e.g., HEVC) semantics to allow a slice to include two or more tiles (e.g., two separate videos to be stitched together), the PPS specifies the title layout. Then, in the slice header, the slice identification (slice_segment_id) is signaled that specifies the address of the first CTU/CTB in the slice. This indicates to the decoder where the slice is located in the picture. And, using the PPS information, the decoder knows if the slice corresponds to the start of a tile. So, if a picture (e.g., frame) has two tiles, and it is desired to send two slices, a PPS is sent that defines the tile layout, e.g., the first slice with first_pic_in_slice equal to true and num_entry_point_offsets=0, and the second slice with first_pic_in_slice_equal to false, slice_segment_id equal to the CTU/CTB address of the first CTU/CTB in the second tile, and num_entry_points_offsets=0. In certain examples, if there is a picture with three tiles, and it is desired to send the first tile in a first slice and the remaining tiles in a second slice, a PPS is sent that defines the tile layout of the first slice with first_pic_in_slice equal to true and num_entry_point_offsets=0, and the second slice with first_pic_in_slice_equal to false, slice_segment_id equal to the CTU/CTB address of the first CTU/CTB in the second tile and num_entry_points_offsets=1 (where the entry_point_offset would point to the location of the third tile in the second slice).

In certain examples, when the basic coding block is too large, it may not align perfectly with the picture size in encoded sequences, leading to incomplete CTBs in the last column or row. To address this, in certain examples, the incomplete CTBs are implicitly partitioned to ensure the entire picture area is covered by complete coding blocks. For example, in a picture with dimensions 1920×1080 and a CTB size of 64, the picture is divided into 30×17 CTBs. Because 1080 is not a multiple of 64, the last row of CTBs is divided using implicit partitioning to ensure coverage in certain examples.

In a situation where a B-reference frame is allowed, if one frame is lost, it will cause a problem for the (e.g., all) frames in that GOP and will propagate until the next I frame. (e.g., IDR frame). As a solution, certain examples herein insert a fill (e.g., black) frame into that GOP of that particular video of a plurality of videos being stitched together, e.g., the next I frame (e.g., IDR frame). In certain examples (e.g., for packet loss/rebuffering handling), one pre-encoded fill (e.g., black) slice of appropriate resolution will be inserted, from lost position to the end of the GOP, for example, where the slice contains all-intra coded CTUs, and is an I slice, this works for both IDR frames and non-IDR frames, and/or the slice concatenated with other NAL headers.

Certain examples herein allow for mixing of I frame with P frame and B frame because the access unit delimiter signals the start of a new access unit and indicates if the access unit contains I slices only, or I and P slices, or if it may contain I, P, and B slices.

Certain examples do not utilize a demuxer to obtain the bitrate from a (e.g., HEVC) video stream. A solution to this is to obtain a frame count, resolution, frame rate, and file size, then calculate bitrate, e.g., to use these parameters to determine a minimum level of bitrate.

Flexible Layout Challenges

In certain examples, there are a few challenges for flexible layout, as explained in this document. For example:

CTB Size Consistency: in certain examples, all videos, before merging, are to have the same CTB size. This uniformity is necessary to ensure that the videos can be stitched together seamlessly. In certain examples, the parameters log2_min_coding_block_size_minus3 and log2_diff_max_min_coding_block_size in the SPS must be identical across all input video streams. These parameters directly influence the CTB size and structure.

In certain examples, each video to be stitched together is to have a resolution that is an integer multiple of the CTB size or be able to be padded to an integer multiple of the CTB size, and the merged stream should not exceed a threshold resolution (e.g., 1080p on devices capable of 1080p playback, and 2160p on device capable 2160p playback).

However, if padded videos were to be used, with the cost of more complex cropping done outside decoder (e.g., by a graphics processor), which has to be aware of the conformance window in each view after the decoder finishes decoding the combined multiple view bitstream. In certain examples, a device has the capability of video composition (e.g., graphics processor).

Merging Algorithm

In certain examples, the input videos are sorted by video resolutions, e.g., the videos are then placed into multiple columns one by one, from the largest to the smallest. In certain examples, each column can only have one resolution, and when the sum of the height of the videos in one column reaches the maximum height, that column is full, and the next video is put into a new column, e.g., until all videos are placed into the frame or maximum width is reached.

Implementation

Figure 15:
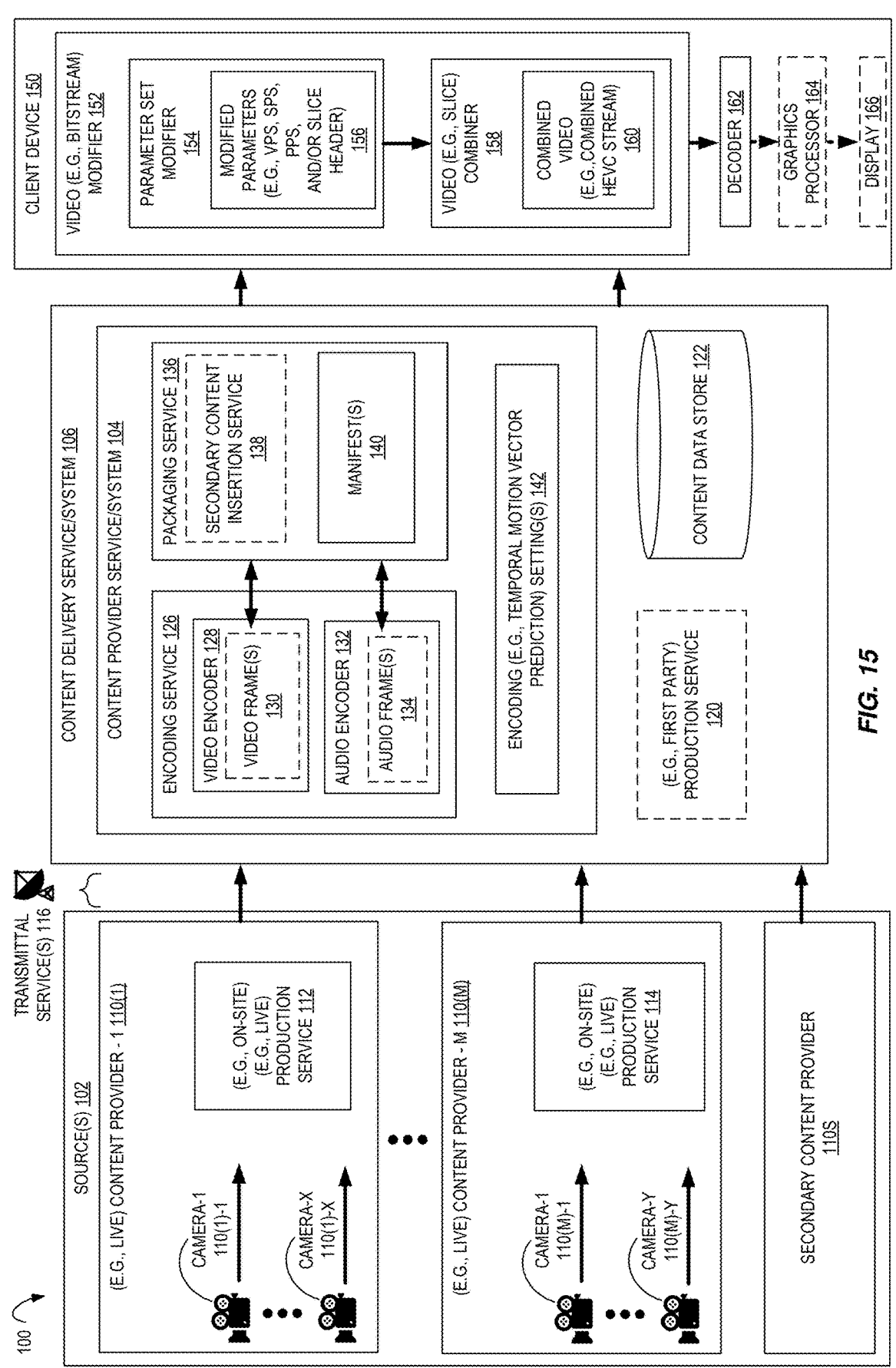
FIG. 15 is a diagram illustrating an environment including one or more content providers to capture an event on a respective set of one or more cameras (e.g., and microphones) and transmit the video (e.g., live stream) (e.g., along with the corresponding audio) to a content delivery service/system for encoding multiple videos for simultaneous viewing according to some examples.

In certain examples, after the layout is calculated, the layout will be determined by making each column as a tile, and treat each video in the column as a slice. As noted above, there are a few flags that are to be changed in certain examples of this process:

conformance_window_flag (SPS): is to be disabled to disable cropping of the stitched frame conf_win_xxxx_offset (SPS): needs to be removed to disable cropping of the stitched frame tiles_enabled_flag (PPS): is to be enabled to have multiple tiles num_tile_columns_minus1, num_tile_rows_minus1, uniform_spacing_flag, row_height_minus1[i], column_width_minus1[i] (PPS): set according to the layout loop_filter_across_tiles_enabled_flag: disabled FIG. 15 is a diagram illustrating an environment 100 including one or more content providers 110(1) to 110(M) to capture an event on a respective set of one or more cameras (e.g., one or more of cameras 110(1)-1 to 110(1)-X, where X is any positive integer greater than one, and one or more of cameras 110(M)-1 to 110(M)-Y, where Y is any positive integer greater than one) (e.g., and microphones) and transmit the video (e.g., live stream) (e.g., along with the corresponding audio) to a content delivery service/system 106 for encoding multiple videos for simultaneous viewing according to some examples.

In certain examples, the content provider service/system 104 (e.g., of content delivery service/system 106) includes an encoder to encode a video. In certain examples, to allow for video combining, one or more encoding settings 142 are modified as discussed herein, e.g., temporal motion vector prediction is disabled. In certain examples, the parameters (e.g., in FIGS. 9-11) are modified by parameter set modifier 154 of client device 150, for example, the alteration of one or more parameters in VPS, SPS, PPS, and/or SSH to enable frame stitching (e.g., in response to a request by the client).

In certain examples, the event is a live event, e.g., a game of a sporting match, such as, but not limited to, each individual game of baseball, softball, football, soccer, basketball, hockey, etc. In certain examples, one or more (e.g., live) content providers (e.g., video production truck(s)) are on site to capture video (e.g., and audio) of the live event.

In certain examples, a (e.g., single) content provider 110(1) is on site to capture video (e.g., and audio) of the live event. In certain examples, content provider 110(1) includes (e.g., or has access to the video output of) one or more of cameras 110(1)-1 to 110(1)-X. In certain examples, content provider 110(1) includes a (e.g., on-site) (e.g., live) production service 112, e.g., to allow multi-camera video production such that the video from two or more cameras and or the audio from two or more audio sources are combined into a single output as a dynamic mix (e.g., by a director). In certain examples, content provider 110(1) is to encode the resulting output and send that encoded content to one or more downstream entities (e.g., content delivery service/ system 106 and/or user(s)), for example, via (e.g., wired and/or wireless) transmittal services 116, e.g., via one or more networks.

In certain examples, one or more additional (e.g., M–1, where M is any positive integer greater than 1) content providers (e.g., content provider 110(M)) are also on site to capture video (e.g., and audio) of the live event. In certain examples, content provider 110(M) includes (e.g., or has access to the video output of) one or more of cameras 110(M)-1 to 110(M)-Y. In certain examples, content provider 110(M) includes a (e.g., on-site) (e.g., live) production service 114, e.g., to allow multi-camera video production such that the video from two or more cameras and or the audio from two or more audio sources are combined into a single output as a dynamic mix (e.g., by a director). In certain examples, content provider 110 is to encode the resulting output and send that encoded content to one or more downstream entities (e.g., content delivery service/system 106 and/or user(s)), for example, via (e.g., wired and/or wireless) transmittal services 116, e.g., via one or more networks.

In certain examples when content providers are different (e.g., different entities, such (e.g., different live streamers or "television" networks), they may use different transmittal services 116, e.g., having different latencies (e.g., different network paths from each content provider to a same client device).

In certain examples, the content from content provider(s) 110(1), 110(M), etc. is sent to one or more content delivery services/systems (e.g., content delivery service/system 106). In certain examples, content delivery service/system 106 sends multiple video streams to client device 150, e.g., to allow the client device (e.g., and not the content delivery service/system 106) to stitch together the videos for simultaneous display.

The depicted content delivery service/system 106 includes a content data store 122, which may be implemented in one or more data centers. As one example, a media file (e.g., including a video file and audio file) (e.g., a media container) that is to be encoded is accessed from the content data store 122 by one or more content provider services/systems 104. In certain examples, the media file may be uploaded to content data store 122 by content provider(s) or provided directly (e.g., as live content) to content provider service/system 104 by content provider(s) (e.g., from a live content encoder).

In certain examples, the content provider service/system 104 controls the encoding (e.g., transcoding) of a media file into packages and files in various formats and in different sizes for distribution to end users (e.g., viewers). In certain examples, a user (e.g., separate from an end user or client) creates a job for a (e.g., uncompressed) multimedia file by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain examples, to set up a job, a user specifies the input files (e.g., from content data store 122) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 126 is to encode the media file (e.g., video file and corresponding audio file) into one or more sets of video and audio representations (e.g., streams), e.g., as indicated by manifests 140. In FIG. 14, video encoder 128 is to receive an input of a video file and create video frame(s) 130 from that video file, e.g., for a video frame and/or fragment duration. In FIG. 14, audio encoder 132 is to receive an input of an audio file and create audio frame(s) 134 (e.g., a number of audio samples within each frame) for that audio file, e.g., at an audio frame and/or fragment duration. In certain examples, packaging service 136 is then to create one or more sets of multimedia (e.g., video and audio) representations (e.g., a media presentation), for example, a representation according to a standard (e.g., a HEVC standard, a MPEG-DASH standard, a Hyper-Text Transfer Protocol (HTTP) Live Streaming (HLS) standard, a Smooth Streaming standard, or other standard). Encoding service 126 may include a plurality of instances of video encoder 128 and audio encoder 132, e.g., to process multiple inputs in parallel. In certain examples, secondary content insertion service 138 adds secondary content (e.g., advertisement(s)) into a main content, e.g., secondary content from secondary content provider 110S. In certain examples, the secondary content provider 110S is a different (e.g., third party) source than the main content. In certain examples, encoding service 126 is to encode both the main content and secondary content, e.g., and the secondary content insertion service 138 is to insert the secondary content into the main content. In other examples, the video modifier 152 of the client device 150 is to insert the secondary content into one or more views of the main content (e.g., for decoding by single decoder 162) according to the disclosure herein.

FIG. 16 is a flow diagram illustrating operations 1600 of a method of generating multiple live video streams, with at least one stream being secondary content, for simultaneous viewing according to some examples. Some or all of the operations 1600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 1600 are performed by a content delivery service/system 106 and/or client device 150 (e.g., video modifier 152 thereof).

The operations 1600 include, at block 1602, sending a first media stream and a second media stream having a segment duration to a single decoder of a device for decoding. The operations 1600 further include, at block 1604, sending, in response to a break within a segment of the first media stream for presenting a secondary content media stream, one or more fill sections to the single decoder of the device to present between a start of the break and an end of the segment of the first media stream for decoding with the second stream. The operations 1600 further include, at block 1606, sending, in response to the break, the secondary content media stream having the segment duration of the first media stream to the single decoder of the device for decoding with the second stream after decoding the one or more fill sections.

At least some examples of the disclosed technologies can be described in view of the following examples:

Example 1. A computer-implemented method comprising:

sending a first live video stream and a second live video stream having a same group of pictures duration to a single decoder of a device for simultaneous viewing;

receiving an indication of a break within a group of pictures of the first live video stream for displaying a secondary content video stream;

sending, in response to the receiving the indication, one or more fill frames to the single decoder of the device to display between a start of the break and an end of the group of pictures of the first live video stream for simultaneous viewing with the second live stream; and sending, in response to the receiving the indication, the secondary content video stream having the same group of pictures duration as the first live video stream, to the single decoder of the device for simultaneous viewing with the second live stream after displaying of the one or more fill frames.

Example 2. The computer-implemented method of example 1, further comprising:

determining, before the sending the secondary content video stream to the single decoder, a duration for the secondary content video stream is not an integer multiple of the group of pictures duration; and encoding, in response to the determining, the secondary content video stream to have a playback speed of the integer multiple of the group of pictures duration.

Example 3. The computer-implemented method of example 1, further comprising:

determining, before the sending the secondary content video stream to the single decoder, a pattern within a group of pictures of the secondary content video stream differs from a corresponding pattern of the first live video stream; and inserting, in response to the determining, one or more fill frames into the group of pictures of the secondary content video stream to align with the corresponding pattern of the first live video stream.

Example 4. A computer-implemented method comprising:

sending a first media stream and a second media stream having a segment duration to a single decoder of a device for decoding;

sending, in response to a break within a segment of the first media stream for presenting a secondary content media stream, one or more fill sections to the single decoder of the device to present between a start of the break and an end of the segment of the first media stream for decoding with the second stream; and sending, in response to the break, the secondary content media stream having the segment duration of the first media stream, to the single decoder of the device for decoding with the second stream after decoding the one or more fill sections.

Example 5. The computer-implemented method of example 4, further comprising:

determining, before the sending the secondary content media stream to the single decoder, a duration for the secondary content media stream is not an integer multiple of the segment duration; and modifying, in response to the determining, a playback speed of the secondary content media stream into the integer multiple of the segment duration.

Example 6. The computer-implemented method of example 5, wherein the modifying the playback speed comprises speeding up at least one segment of the secondary content media stream to cause the secondary content media stream to have the integer multiple of the segment duration.

Example 7. The computer-implemented method of example 5, wherein the modifying the playback speed comprises speeding up at least one segment of the secondary content media stream, and slowing down at least one other segment of the secondary content media stream to cause the secondary content media stream to have the integer multiple of the segment duration.

Example 8. The computer-implemented method of example 4, wherein the one or more fill sections comprise a slate frame.

Example 9. The computer-implemented method of example 4, further comprising generating an intra-predicted version of a last frame of the segment of the first media stream before the break, wherein the one or more fill sections comprise the intra-predicted version of the last frame of the segment of the first media stream before the break.

Example 10. The computer-implemented method of example 4, wherein the sending the first media stream comprises not including one or more sections of the first media stream between an end of the break and a start of a later segment of the first media stream in response to the sending of the secondary content media stream.

Example 11. The computer-implemented method of example 4, further comprising generating, in response to determining the break within the segment of the first media stream for presenting the secondary content media stream, a reference picture set for the first media stream that includes one or more reference frames of the secondary content media stream.

Example 12. The computer-implemented method of example 4, further comprising:

determining the secondary content media stream has a lower frame rate than a frame rate of the first media stream; and converting the secondary content media stream to the frame rate of the first media stream before sending the secondary content media stream to the single decoder of the device.

Example 13. The computer-implemented method of example 12, wherein the converting comprises inserting one or more skip frames into the secondary content media stream.

Example 14. The computer-implemented method of example 4, further comprising:

determining, before the sending the secondary content media stream to the single decoder, a pattern within a segment of the secondary content media stream differs from a corresponding pattern of the first media stream; and inserting, in response to the determining, one or more fill sections into the segment of the secondary content media stream to align with the corresponding pattern of the first media stream.

Example 15. A non-transitory computer-readable medium storing code that, when executed by a device, causes the device to perform a method comprising:

sending a first media stream and a second media stream having a segment duration, to a single decoder of a device for decoding;

sending, in response to a break within a segment of the first media stream for presenting a secondary content media stream, one or more fill sections to the single decoder of the device to present between a start of the break and an end of the segment of the first media stream for decoding with the second stream; and sending, in response to the break, the secondary content media stream having the segment duration of the first media stream, to the single decoder of the device for simultaneous viewing with the second stream after decoding the one or more fill sections.

Example 16. The non-transitory computer-readable medium of example 15, wherein the method further comprises:

determining, before the sending the secondary content media stream to the single decoder, a duration for the secondary content media stream is not an integer multiple of the segment duration; and modifying, in response to the determining, a playback speed of the secondary content media stream into the integer multiple of the segment duration.

Example 17. The non-transitory computer-readable medium of example 16, wherein the modifying the playback speed comprises speeding up at least one segment of the secondary content media stream, and slowing down at least one other segment of the secondary content media stream to cause the secondary content media stream to have the integer multiple of the segment duration.

Example 18. The non-transitory computer-readable medium of example 15, wherein the method further comprises generating an intra-predicted version of a last frame of the segment of the first media stream before the break, and wherein the one or more fill sections comprise the intra-predicted version of the last frame of the segment of the first media stream before the break.

Example 19. The non-transitory computer-readable medium of example 15, wherein the sending the first media stream comprises not including one or more sections of the first media stream between an end of the break and a start of a later segment of the first media stream in response to the sending of the secondary content media stream.

Example 20. The non-transitory computer-readable medium of example 15, wherein the method further comprises generating, in response to determining the break within the segment of the first media stream for presenting the secondary content media stream, a reference picture set for the first media stream that includes one or more reference frames of the secondary content media stream.

Exemplary environments, systems, etc. that the above may be used in are detailed below.

Figure 17:
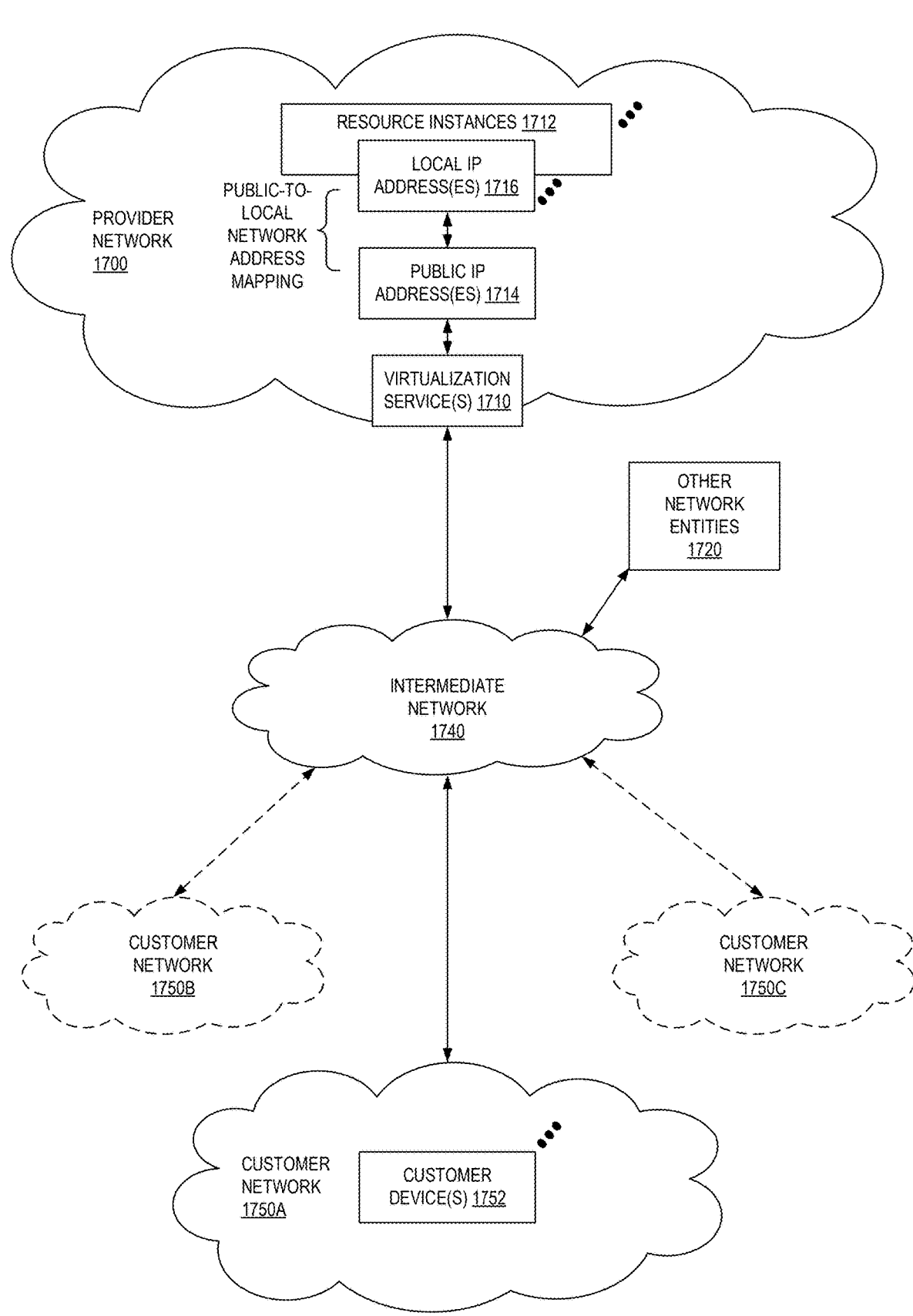
FIG. 17 illustrates an example provider network environment according to some examples.

FIG. 17 illustrates an example provider network (or "service provider system") environment according to some examples. A provider network 1700 may provide resource virtualization to customers via one or more virtualization services 1710 that allow customers to purchase, rent, or otherwise obtain instances 1712 of virtualized resources, including but not limited to computation and storage resources, implemented on devices within the provider network or networks in one or more data centers. Local Internet Protocol (IP) addresses 1716 may be associated with the resource instances 1712; the local IP addresses are the internal network addresses of the resource instances 1712 on the provider network 1700. In some examples, the provider network 1700 may also provide public IP addresses 1714 and/or public IP address ranges (e.g., Internet Protocol version 4 (IPv4) or Internet Protocol version 6 (IPv6) addresses) that customers may obtain from the provider 1700.

Conventionally, the provider network 1700, via the virtualization services 1710, may allow a customer of the service provider (e.g., a customer that operates one or more client networks 1750A-1750C including one or more customer device(s) 1752) to dynamically associate at least some public IP addresses 1714 assigned or allocated to the customer with particular resource instances 1712 assigned to the customer. The provider network 1700 may also allow the customer to remap a public IP address 1714, previously mapped to one virtualized computing resource instance 1712 allocated to the customer, to another virtualized computing resource instance 1712 that is also allocated to the customer. Using the virtualized computing resource instances 1712 and public IP addresses 1714 provided by the service provider, a customer of the service provider such as the operator of customer network(s) 1750A-1750C may, for example, implement customer-specific applications and present the customer's applications on an intermediate network 1740, such as the Internet. Other network entities 1720 on the intermediate network 1740 may then generate traffic to a destination public IP address 1714 published by the customer network(s) 1750A-1750C; the traffic is routed to the service provider data center, and at the data center is routed, via a network substrate, to the local IP address 1716 of the virtualized computing resource instance 1712 currently mapped to the destination public IP address 1714. Similarly, response traffic from the virtualized computing resource instance 1712 may be routed via the network substrate back onto the intermediate network 1740 to the source entity 1720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 1700; a customer may then assign their allocated public IP addresses to particular resource instances allocated to the customer. These public IP addresses may be referred to as customer public IP addresses, or simply customer IP addresses. Instead of being assigned by the provider network 1700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 18:
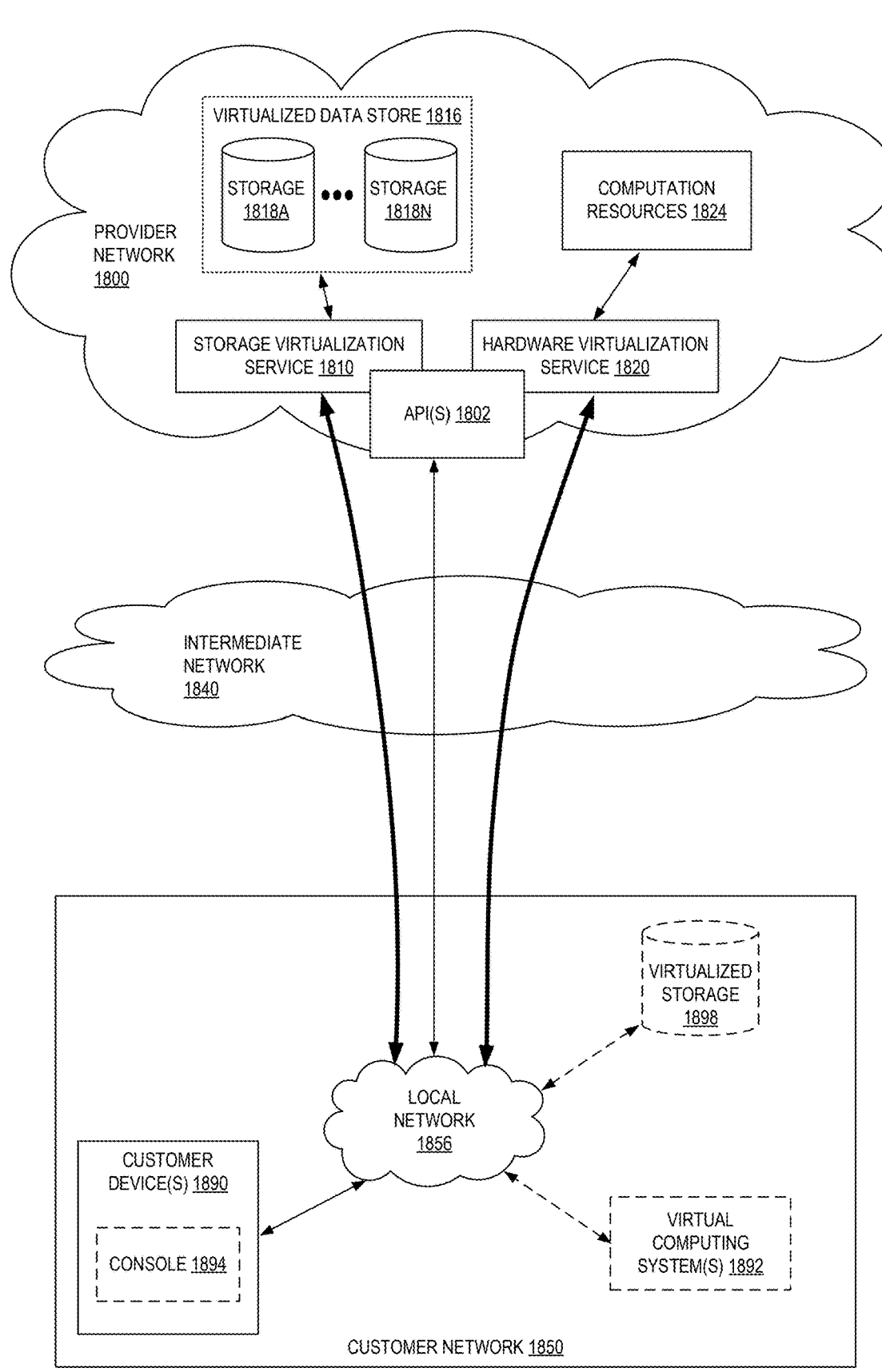
FIG. 18 is a block diagram of an example provider network that provides a storage service and a hardware virtualization service to customers according to some examples.

FIG. 18 is a block diagram of an example provider network that provides a storage service and a hardware virtualization service to customers, according to some examples. Hardware virtualization service 1820 provides multiple computation resources 1824 (e.g., VMs) to customers. The computation resources 1824 may, for example, be rented or leased to customers of the provider network 1800 (e.g., to a customer that implements customer network 1850). Each computation resource 1824 may be provided with one or more local IP addresses. Provider network 1800 may be configured to route packets from the local IP addresses of the computation resources 1824 to public Internet destinations, and from public Internet sources to the local IP addresses of computation resources 1824.

Provider network 1800 may provide a customer network 1850, for example coupled to intermediate network 1840 via local network 1856, the ability to implement virtual computing systems 1892 via hardware virtualization service 1820 coupled to intermediate network 1840 and to provider network 1800. In some examples, hardware virtualization service 1820 may provide one or more APIs 1802, for example a web services interface, via which a customer network 1850 may access functionality provided by the hardware virtualization service 1820, for example via a console 1894 (e.g., a web-based application, standalone application, mobile application, etc.). In some examples, at the provider network 1800, each virtual computing system 1892 at customer network 1850 may correspond to a computation resource 1824 that is leased, rented, or otherwise provided to customer network 1850.

From an instance of a virtual computing system 1892 and/or another customer device 1890 (e.g., via console 1894), the customer may access the functionality of storage service 1810, for example via one or more APIs 1802, to access data from and store data to storage resources 1818A-1818N of a virtual data store 1816 (e.g., a folder or "bucket", a virtualized volume, a database, etc.) provided by the provider network 1800. In some examples, a virtualized data store gateway (not shown) may be provided at the customer network 1850 that may locally cache at least some data, for example frequently-accessed or critical data, and that may communicate with storage service 1810 via one or more communications channels to upload new or modified data from a local cache so that the primary store of data (virtualized data store 1816) is maintained. In some examples, a user, via a virtual computing system 1892 and/or on another customer device 1890, may mount and access virtual data store 1816 volumes via storage service 1810 acting as a storage virtualization service, and these volumes may appear to the user as local (virtualized) storage 1898.

While not shown in FIG. 18, the virtualization service(s) may also be accessed from resource instances within the provider network 1800 via API(s) 1802. For example, a customer, appliance service provider, or other entity may access a virtualization service from within a respective virtual network on the provider network 1800 via an API 1802 to request allocation of one or more resource instances within the virtual network or within another virtual network.

Illustrative System

Figure 19:
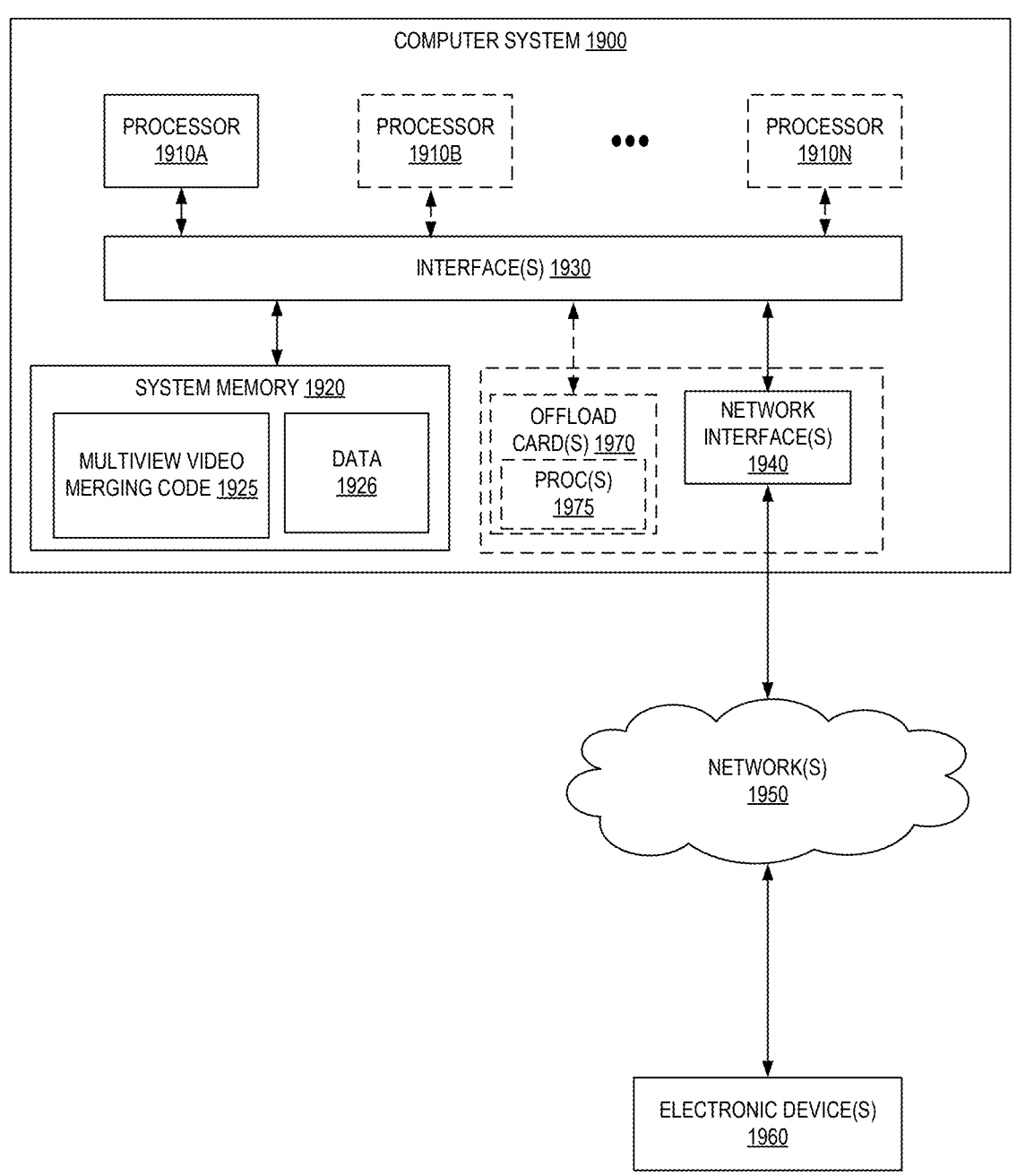
FIG. 19 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1900 illustrated in FIG. 19. In the illustrated example, computer system 1900 includes one or more processors 1910 coupled to a system memory 1920 via an input/output (I/O) interface 1930. Computer system 1900 further includes a network interface 1940 coupled to I/O interface 1930. While FIG. 19 shows computer system 1900 as a single computing device, in various examples a computer system 1900 may include one computing device or any number of computing devices configured to work together as a single computer system 1900.

In various examples, computer system 1900 may be a uniprocessor system including one processor 1910, or a multiprocessor system including several processors 1910 (e.g., two, four, eight, or another suitable number). Processors 1910 may be any suitable processors capable of executing instructions. For example, in various examples, processors 1910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1910 may commonly, but not necessarily, implement the same ISA.

System memory 1920 may store instructions and data accessible by processor(s) 1910. In various examples, system memory 1920 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1920 as multiview video merging code 1925 (e.g., executable to implement, in whole or in part, video merging (e.g., with secondary content) as discussed herein) and data 1926.

In one example, I/O interface 1930 may be configured to coordinate I/O traffic between processor 1910, system memory 1920, and any peripheral devices in the device, including network interface 1940 or other peripheral interfaces. In some examples, I/O interface 1930 may perform any necessary protocol, timing, or other data transformations to convert data signals from one component (e.g., system memory 1920) into a format suitable for use by another component (e.g., processor 1910). In some examples, I/O interface 1930 may include support for devices attached through various types of peripheral buses, such as a variant of the Peripheral Component Interconnect (PCI) bus standard or the Universal Serial Bus (USB) standard, for example. In some examples, the function of I/O interface 1930 may be split into two or more separate components, such as a north bridge and a south bridge, for example. Also, in some examples some or all of the functionality of I/O interface 1930, such as an interface to system memory 1920, may be incorporated directly into processor 1910.

Network interface 1940 may be configured to allow data to be exchanged between computer system 1900 and other devices 1960 attached to a network or networks 1950, such as other computer systems or devices as illustrated in FIG. 1, for example. In various examples, network interface 1940 may support communication via any suitable wired or wireless general data networks, such as types of Ethernet network, for example. Additionally, network interface 1940 may support communication via telecommunications/tele-phony networks such as analog voice networks or digital fiber communications networks, via storage area networks (SANs) such as Fibre Channel SANs, or via I/O any other suitable type of network and/or protocol.

In some examples, a computer system 1900 includes one or more offload cards 1970 (including one or more proces-sors 1975, and possibly including the one or more network interfaces 1940) that are connected using an I/O interface 1930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1900 may act as a host electronic device (e.g., operating as part of a hardware virtualization service) that hosts compute instances, and the one or more offload cards 1970 execute a virtualization manager that can manage compute instances that execute on the host electronic device. As an example, in some examples the offload card(s) 1970 can perform compute instance management operations such as pausing and/or un-pausing compute instances, launching and/or terminating compute instances, performing memory transfer/copying operations, etc. These management operations may, in some examples, be performed by the offload card(s) 1970 in coordination with a hypervisor (e.g., upon a request from a hypervisor) that is executed by the other processors 1910A-1910N of the computer system 1900. However, in some examples the virtualization manager implemented by the offload card(s) 1970 can accommodate requests from other entities (e.g., from compute instances themselves), and may not coordi-nate with (or service) any separate hypervisor.

In some examples, system memory 1920 may be one example of a computer-accessible medium configured to store program instructions and data as described above. However, in other examples, program instructions and/or data may be received, sent, or stored upon different types of computer-accessible media. Generally speaking, a com-puter-accessible medium may include non-transitory storage media or memory media such as magnetic or optical media, e.g., disk or DVD/CD coupled to computer system 1900 via I/O interface 1930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 1900 as system memory 1920 or another type of memory. Further, a computer-accessible medium may include transmission media or signals such as electrical, electromagnetic, or digital signals, conveyed via a commu-nication medium such as a network and/or a wireless link, such as may be implemented via network interface 1940.

Figure 20:
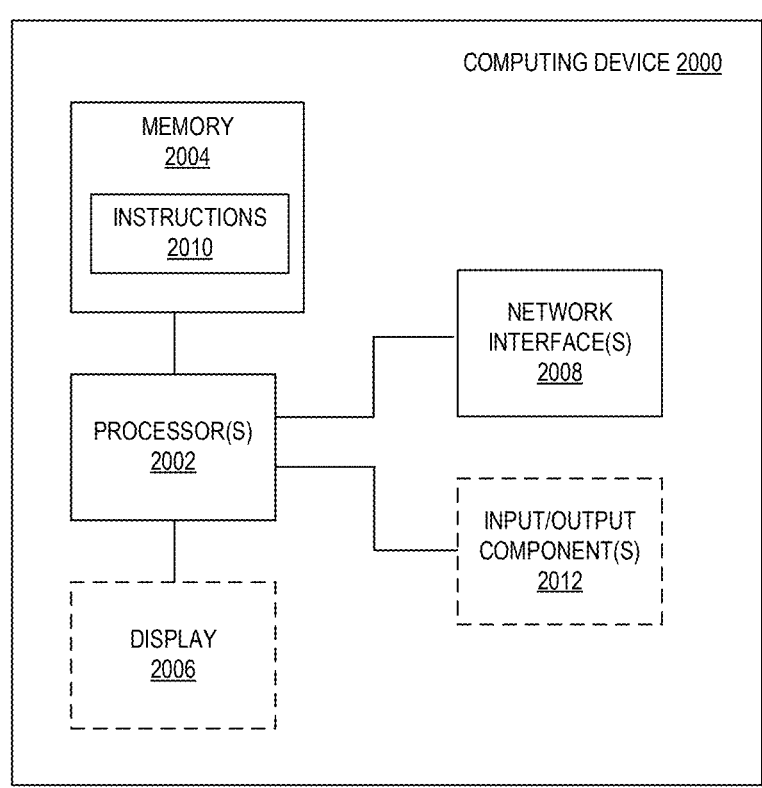
FIG. 20 illustrates a logical arrangement of a set of general components of an exemplary computing device that can be utilized in accordance with various examples.

FIG. 20 illustrates a logical arrangement of a set of general components of an example computing device 2000. Generally, a computing device 2000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory com-puter-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 2002 (e.g., wherein a processor is a microprocessor, controller, micro-controller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 2004) to store code (for example, instructions 2010, e.g., which implement a content delivery service as disclosed herein), and a set of one or more wired or wireless network interfaces 2008 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 2004) of a given electronic device typically stores code (e.g., instructions 2010) for execution on the set of one or more processors 2002 of that electronic device. One or more parts of various examples may be implemented using different combinations of software, firmware, and/or hard-ware.

A computing device 2000 can include some type of display element 2006, such as a touch screen or liquid crystal display (LCD), although many devices such as portable media players might convey information via other means, such as through audio speakers, and other types of devices such as server end stations may not have a display element 2006 at all. As discussed, some computing devices used in some examples include at least one input and/or output component(s) 2012 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 21:
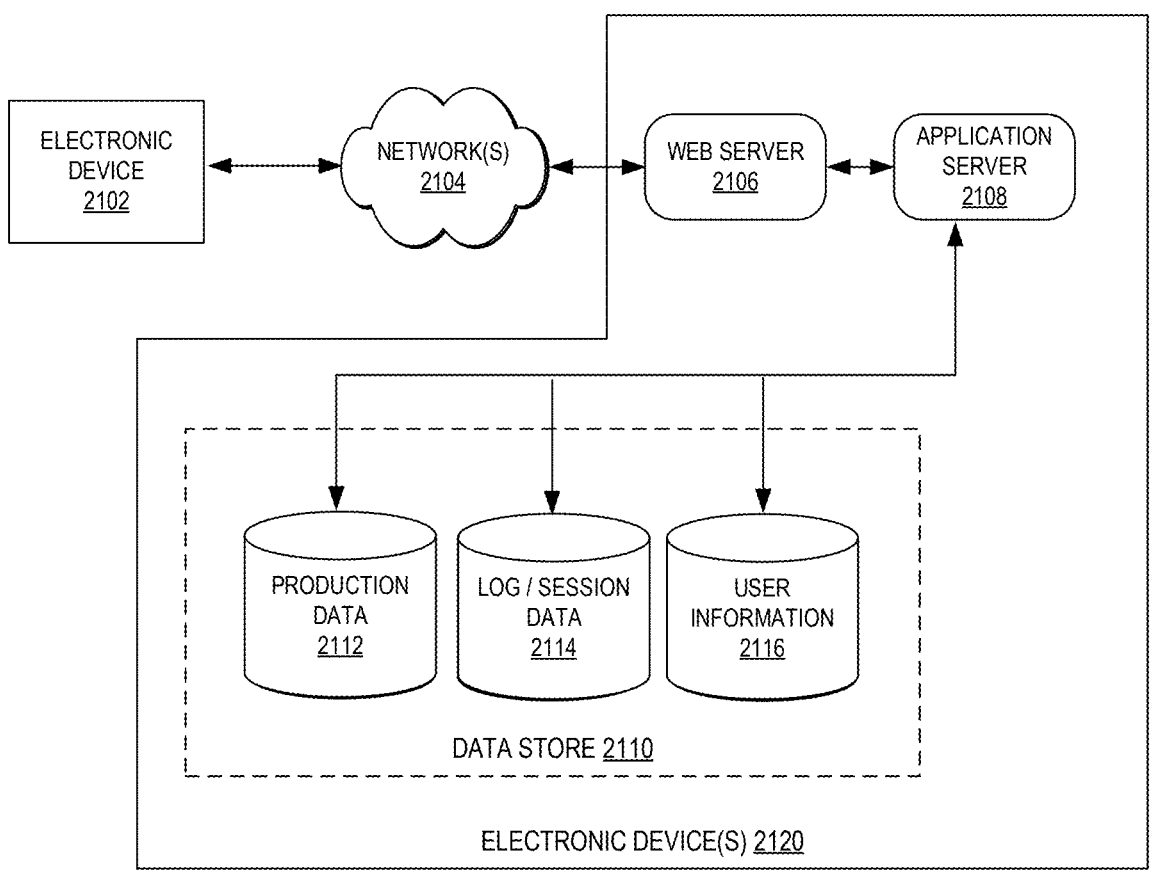
FIG. 21 illustrates an example of an environment for implementing aspects in accordance with various examples.

As discussed, different approaches can be implemented in various environments in accordance with the described examples. For example, FIG. 21 illustrates an example of an environment 2100 for implementing aspects in accordance with various examples. For example, in some examples messages are HyperText Transfer Protocol (HTTP) requests that are received by a web server (e.g., web server 2106), and the users, via electronic devices, may interact with the provider network via a web portal provided via the web server 2106 and application server 2108. As will be appre-ciated, although a web-based environment is used for pur-poses of explanation, different environments may be used, as appropriate, to implement various examples. The system includes an electronic client device 2102, which may also be referred to as a client device and can be any appropriate device operable to send and receive requests, messages, or information over an appropriate network 2104 and convey information back to a user of the device 2102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 2104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 2104 includes the Internet, as the environment includes a web server 2106 for receiving requests and serving content in response thereto, although for other networks an alternative device serving a similar purpose could be used, as would be apparent to one of ordinary skill in the art.

The illustrative environment includes at least one application server 2108 and a data store 2110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 2108 can include any appropriate hardware and software for integrating with the data store 2110 as needed to execute aspects of one or more applications for the client device 2102 and handling a majority of the data access and business logic for an application. The application server 2108 provides access control services in cooperation with the data store 2110 and is able to generate content such as text, graphics, audio, video, etc., to be transferred to the client device 2102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 2102 and the application server 2108, can be handled by the web server 2106. It should be understood that the web server 2106 and application server 2108 are not required and are merely example components, as structured code discussed herein can be executed on any appropriate device or host machine as discussed elsewhere herein.

The data store 2110 can include several separate data tables, databases, or other data storage mechanisms and media for storing data relating to a particular aspect. For example, the data store illustrated includes mechanisms for storing production data 2112 and user information 2116, which can be used to serve content for the production side. The data store 2110 also is shown to include a mechanism for storing log or session data 2114. It should be understood that there can be many other aspects that may need to be stored in the data store, such as page image information and access rights information, which can be stored in any of the above listed mechanisms as appropriate or in additional mechanisms in the data store 2110. The data store 2110 is operable, through logic associated therewith, to receive instructions from the application server 2108 and obtain, update, or otherwise process data in response thereto. In one example, a user might submit a search request for a certain type of item. In this case, the data store 2110 might access the user information 2116 to verify the identity of the user and can access a production data 2112 to obtain information about items of that type. The information can then be returned to the user, such as in a listing of results on a web page that the user is able to view via a browser on the user device 2102. Information for a particular item of interest can be viewed in a dedicated page or window of the browser.

The web server 2106, application server 2108, and/or data store 2110 may be implemented by one or more electronic devices 2120, which can also be referred to as electronic server devices or server end stations, and may or may not be located in different geographic locations. Each of the one or more electronic devices 2120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 21. Thus, the depiction of the environment 2100 in FIG. 21 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle (R), Microsoft (R), Sybase (R), IBM (R), etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 1818A-1818N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," "certain examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

sending a first live video stream and a second live video stream having a same group of pictures duration to a single decoder of a device for simultaneous viewing;

receiving an indication of a break within a group of pictures of the first live video stream for displaying a secondary content video stream;

sending, in response to the receiving the indication, one or more fill frames to the single decoder of the device to display between a start of the break and an end of the group of pictures of the first live video stream for simultaneous viewing with the second live stream; and sending, in response to the receiving the indication, the secondary content video stream having the same group of pictures duration as the first live video stream to the single decoder of the device for simultaneous viewing with the second live stream after displaying of the one or more fill frames.

2. The computer-implemented method of claim 1, further comprising:

determining, before the sending the secondary content video stream to the single decoder, a duration for the secondary content video stream is not an integer multiple of the group of pictures duration; and encoding, in response to the determining, the secondary content video stream to have a playback speed of the integer multiple of the group of pictures duration.

3. The computer-implemented method of claim 1, further comprising:

determining, before the sending the secondary content video stream to the single decoder, a pattern within a group of pictures of the secondary content video stream differs from a corresponding pattern of the first live video stream; and inserting, in response to the determining, one or more fill frames into the group of pictures of the secondary content video stream to align with the corresponding pattern of the first live video stream.

4. A computer-implemented method comprising:

sending a first media stream and a second media stream having a segment duration to a single decoder of a device for decoding;

sending, in response to a break within a segment of the first media stream for presenting a secondary content media stream, one or more fill sections to the single decoder of the device to present between a start of the break and an end of the segment of the first media stream for decoding with the second stream; and sending, in response to the break, the secondary content media stream having the segment duration of the first media stream to the single decoder of the device for decoding with the second stream after decoding the one or more fill sections.

5. The computer-implemented method of claim 4, further comprising:

determining, before the sending the secondary content media stream to the single decoder, a duration for the secondary content media stream is not an integer multiple of the segment duration; and modifying, in response to the determining, a playback speed of the secondary content media stream into the integer multiple of the segment duration.

6. The computer-implemented method of claim 5, wherein the modifying the playback speed comprises speeding up at least one segment of the secondary content media stream to cause the secondary content media stream to have the integer multiple of the segment duration.

7. The computer-implemented method of claim 5, wherein the modifying the playback speed comprises speeding up at least one segment of the secondary content media stream, and slowing down at least one other segment of the secondary content media stream to cause the secondary content media stream to have the integer multiple of the segment duration.

8. The computer-implemented method of claim 4, wherein the one or more fill sections comprise a slate frame.

9. The computer-implemented method of claim 4, further comprising generating an intra-predicted version of a last frame of the segment of the first media stream before the break, wherein the one or more fill sections comprise the intra-predicted version of the last frame of the segment of the first media stream before the break.

10. The computer-implemented method of claim 4, wherein the sending the first media stream comprises not including one or more sections of the first media stream between an end of the break and a start of a later segment of the first media stream in response to the sending of the secondary content media stream.

11. The computer-implemented method of claim 4, further comprising generating, in response to determining the break within the segment of the first media stream for presenting the secondary content media stream, a reference picture set for the first media stream that includes one or more reference frames of the secondary content media stream.

12. The computer-implemented method of claim 4, further comprising:

determining the secondary content media stream has a lower frame rate than a frame rate of the first media stream; and converting the secondary content media stream to the frame rate of the first media stream before sending the secondary content media stream to the single decoder of the device.

13. The computer-implemented method of claim 12, wherein the converting comprises inserting one or more skip frames into the secondary content media stream.

14. The computer-implemented method of claim 4, further comprising:

determining, before the sending the secondary content media stream to the single decoder, a pattern within a segment of the secondary content media stream differs from a corresponding pattern of the first media stream; and inserting, in response to the determining, one or more fill sections into the segment of the secondary content media stream to align with the corresponding pattern of the first media stream.

15. A non-transitory computer-readable medium storing code that, when executed by a device, causes the device to perform a method comprising:

sending a first media stream and a second media stream having a segment duration, to a single decoder of a device for decoding;

sending, in response to a break within a segment of the first media stream for presenting a secondary content media stream, one or more fill sections to the single decoder of the device to present between a start of the break and an end of the segment of the first media stream for decoding with the second stream; and sending, in response to the break, the secondary content media stream having the segment duration of the first media stream to the single decoder of the device for simultaneous viewing with the second stream after decoding the one or more fill sections.

16. The non-transitory computer-readable medium of claim 15, wherein the method further comprises:

determining, before the sending the secondary content media stream to the single decoder, a duration for the secondary content media stream is not an integer multiple of the segment duration; and modifying, in response to the determining, a playback speed of the secondary content media stream into the integer multiple of the segment duration.

17. The non-transitory computer-readable medium of claim 16, wherein the modifying the playback speed comprises speeding up at least one segment of the secondary content media stream, and slowing down at least one other segment of the secondary content media stream to cause the secondary content media stream to have the integer multiple of the segment duration.

18. The non-transitory computer-readable medium of claim 15, wherein the method further comprises generating an intra-predicted version of a last frame of the segment of the first media stream before the break, and wherein the one or more fill sections comprise the intra-predicted version of the last frame of the segment of the first media stream before the break.

19. The non-transitory computer-readable medium of claim 15, wherein the sending the first media stream comprises not including one or more sections of the first media stream between an end of the break and a start of a later segment of the first media stream in response to the sending of the secondary content media stream.

20. The non-transitory computer-readable medium of claim 15, wherein the method further comprises generating, in response to determining the break within the segment of the first media stream for presenting the secondary content media stream, a reference picture set for the first media stream that includes one or more reference frames of the secondary content media stream.

* * * * *